US011260454B2

(12) United States Patent
Dave et al.

(10) Patent No.: US 11,260,454 B2
(45) Date of Patent: Mar. 1, 2022

(54) CORRECTION OF NON-IMAGING THERMAL MEASUREMENT DEVICES

(71) Applicant: SIGMA LABS, INC., Santa Fe, NM (US)

(72) Inventors: Vivek R. Dave, Concord, NH (US); Mark J. Cola, Santa Fe, NM (US)

(73) Assignee: SIGMA LABS, INC., Santa Fe, NM (US)

( * ) Notice: Subject to any disclaimer, the term of this patent is extended or adjusted under 35 U.S.C. 154(b) by 491 days.

(21) Appl. No.: 16/182,462

(22) Filed: Nov. 6, 2018

(65) Prior Publication Data
US 2019/0134709 A1 May 9, 2019

Related U.S. Application Data

(60) Provisional application No. 62/582,895, filed on Nov. 7, 2017, provisional application No. 62/633,487, filed
(Continued)

(51) Int. Cl.
*B22F 10/31* (2021.01)
*B29C 64/393* (2017.01)
(Continued)

(52) U.S. Cl.
CPC .............. *B22F 10/20* (2021.01); *B22F 10/31* (2021.01); *B29C 64/393* (2017.08); *B33Y 10/00* (2014.12);
(Continued)

(58) Field of Classification Search
CPC .. B22F 2203/03; B22F 2203/11; B29C 64/00; B29C 64/10; B29C 64/141;
(Continued)

(56) References Cited

U.S. PATENT DOCUMENTS 5,552,575 A 9/1996 Doumanidis
7,515,986 B2 4/2009 Huskamp
(Continued)

FOREIGN PATENT DOCUMENTS

CN 1135732 A 11/1996
CN 1976800 A 6/2007
(Continued)

OTHER PUBLICATIONS

U.S. Appl. No. 16/052,488, "Notice of Allowance", dated Aug. 9, 2019, 6 pages.
(Continued)

*Primary Examiner* — Vanessa T. Luk
(74) *Attorney, Agent, or Firm* — Kilpatrick Townsend & Stockton LLP

(57) ABSTRACT

A system and a corresponding method of correcting temperature data from a non-imaging optical sensor involve collecting temperature data generated using the optical sensor. The temperature data describes temperature changes across a surface of a material during an additive manufacturing operation in which the material is heated by a heat source. The method includes estimating a size of a hot spot corresponding to a hottest region formed on the surface by the heat source; and estimating a size of a heated region corresponding to a locus of points within the field of view that contribute to the temperature data. The method further includes correcting the temperature data based on the estimated sizes of the hot spot and the heated region.

20 Claims, 16 Drawing Sheets

Related U.S. Application Data on Feb. 21, 2018, provisional application No. 62/643,457, filed on Mar. 15, 2018.

(51) Int. Cl.

| | |
|---|---|
| *B33Y 50/02* | (2015.01) |
| *B22F 10/20* | (2021.01) |
| *B33Y 10/00* | (2015.01) |
| *B33Y 30/00* | (2015.01) |
| *G05B 15/00* | (2006.01) |
| *B22F 10/30* | (2021.01) |

(52) U.S. Cl.
CPC .............. *B33Y 30/00* (2014.12); *B33Y 50/02* (2014.12); *B22F 10/30* (2021.01); *G05B 15/00* (2013.01)

(58) Field of Classification Search
CPC ... B29C 64/153; B29C 64/165; B29C 64/171; B29C 64/176; B29C 64/182; B29C 64/20; B29C 64/264; B29C 64/268; B29C 64/273; B29C 64/277; B29C 64/282; B29C 64/286; B29C 64/291; B29C 64/295; B29C 64/386; B29C 64/393; B33Y 10/00; B33Y 30/00; B33Y 50/00; B33Y 50/02; G05B 15/00; G05B 19/404; G05B 2219/37211; G05B 2219/42148; G05B 2219/49073; G05B 2219/49206; G05B 2219/49216; G05B 2219/49217; G05B 2219/49219; G01N 21/0332; G01N 2021/1731; G01N 2021/414; G05D 23/1928; G05D 23/193; G05D 23/1931; G05D 23/1932; G05D 23/1934; G05D 23/1935; G05D 23/1951; G05D 23/30; G05D 23/303; G05D 23/306; G05D 23/32; G01J 1/0252; G01J 3/0286; G01J 2005/0085; G01J 2005/0092

See application file for complete search history.

(56) References Cited

U.S. PATENT DOCUMENTS

| | | | |
|---|---|---|---|
| 8,137,739 B2 | 3/2012 | Philippi et al. | |
| 9,533,375 B2 | 1/2017 | Cho et al. | |
| 9,925,715 B2 | 3/2018 | Cheverton et al. | |
| 10,207,363 B2 | 2/2019 | Craig et al. | |
| 10,479,020 B2 | 11/2019 | Madigan et al. | |
| 2003/0234239 A1 | 12/2003 | Lee et al. | |
| 2004/0200816 A1 | 10/2004 | Chung et al. | |
| 2008/0262659 A1* | 10/2008 | Huskamp ............... G05D 23/27 700/300 |
| 2010/0249979 A1 | 9/2010 | John et al. | |
| 2010/0256945 A1 | 10/2010 | Murata | |
| 2013/0105447 A1 | 5/2013 | Haake | |
| 2014/0314613 A1 | 10/2014 | Hopkinson et al. | |
| 2015/0048058 A1 | 2/2015 | Bruck et al. | |
| 2015/0048064 A1* | 2/2015 | Cheverton ........... B23K 26/342 219/121.63 |
| 2015/0268099 A1 | 9/2015 | Craig et al. | |
| 2016/0096236 A1 | 4/2016 | Cho et al. | |
| 2016/0151859 A1 | 6/2016 | Sparks | |
| 2016/0185048 A1 | 6/2016 | Dave et al. | |
| 2016/0228987 A1 | 8/2016 | Baudimont et al. | |
| 2016/0236279 A1 | 8/2016 | Ashton et al. | |
| 2016/0347005 A1 | 12/2016 | Miller | |
| 2017/0016781 A1 | 1/2017 | Dave et al. | |
| 2017/0090462 A1 | 3/2017 | Dave et al. | |
| 2017/0102689 A1 | 4/2017 | Khajepour et al. | |
| 2017/0151628 A1 | 6/2017 | Craig et al. | |
| 2017/0217104 A1 | 8/2017 | Cortes I Herms et al. | |
| 2017/0266762 A1 | 9/2017 | Dave et al. | |
| 2017/0334144 A1 | 11/2017 | Fish et al. | |
| 2018/0169948 A1 | 6/2018 | Coeck et al. | |
| 2018/0186079 A1 | 7/2018 | Vilajosana et al. | |
| 2018/0229303 A1 | 8/2018 | Burlatsky et al. | |
| 2018/0281286 A1 | 10/2018 | Vilajosana et al. | |
| 2018/0345649 A1 | 12/2018 | Prakash | |
| 2019/0009463 A1 | 1/2019 | Vilajosana et al. | |
| 2019/0022946 A1 | 1/2019 | Jones et al. | |
| 2019/0039318 A1 | 2/2019 | Madigan et al. | |
| 2019/0047226 A1 | 2/2019 | Ishikawa et al. | |
| 2019/0095555 A1 | 3/2019 | Lopez et al. | |
| 2019/0113398 A1* | 4/2019 | Comas ................ G01J 5/041 |
| 2019/0118300 A1 | 4/2019 | Penny et al. | |
| 2019/0128738 A1* | 5/2019 | Lo ...................... B29C 64/386 |
| 2019/0217416 A1 | 7/2019 | Brochu | |
| 2020/0064289 A1 | 2/2020 | Huang et al. | |
| 2021/0078076 A1 | 3/2021 | Jurg et al. | |

FOREIGN PATENT DOCUMENTS

| | | | |
|---|---|---|---|
| CN | 104470703 A | 3/2015 |
| CN | 105058788 A | 11/2015 |
| CN | 105499569 A | 4/2016 |
| CN | 106794605 A | 5/2017 |
| CN | 111107974 A | 5/2020 |
| DE | 102009015282 A1 | 10/2010 |
| EP | 3127635 A1 | 2/2017 |
| JP | 2015199195 A | 11/2015 |
| JP | 2016540109 A | 12/2016 |
| JP | 2016540895 A | 12/2016 |
| KR | 101697530 B1 | 1/2017 |
| WO | 2015121730 A1 | 8/2015 |
| WO | 2016050319 A1 | 4/2016 |
| WO | 2017071741 A1 | 5/2017 |

OTHER PUBLICATIONS

U.S. Appl. No. 16/052,488, "Ex Parte Quayle Action", Dec. 20, 2018, 6 pages.
PCT/US2018/044884, "International Search Report and Written Opinion", dated Oct. 15, 2018, 8 pages.
U.S. Appl. No. 16/052,488, "Non-Final Office Action", dated May 1, 2019, 17 pages.
PCT/US2019/019009, "International Search Report and Written Opinion", dated May 8, 2019, 7 pages.
DE112018001597.1, "Office Action", dated Jul. 15, 2020, 6 pages.
PCT/US2019/019009, "International Preliminary Report on Patentability", dated Sep. 3, 2020, 6 pages.
U.S. Appl. No. 16/282,004, "Non-Final Office Action", dated Nov. 8, 2019, 16 Pages.
U.S. Appl. No. 16/282,004, "Notice of Allowance", dated Mar. 9, 2020, 14 pages.
EP18840578.1, "Extended European Search Report", dated Nov. 5, 2019, 8 pages.
PCT/US2018/044884, "International Preliminary Report on Patentability", dated Feb. 13, 2020, 7 pages.
Bockh, et al., "Wärmeübertragung", Grundlagen und Praxis, Springer, 2014, 322 pages.
DE112018001597.1, "Notice of Decision to Grant", dated Feb. 25, 2021, 9 pages.
DE112019000498.0, "Office Action", dated Mar. 2, 2021, 9 pages.
EP18840578.1, "Office Action", dated Mar. 12, 2021, 5 pages.
KR10-2020-7005720, "Office Action", dated Mar. 8, 2021, 6 pages.
CN201880064101.1, "Office Action", dated Jul. 5, 2021, 15 pages.
U.S. Appl. No. 16/574,388, "Non-Final Office Action", dated Nov. 19, 2021, 9 pages.
JP2020-529102, "Notice of Allowance", dated Jan. 4, 2022, 3 pages.

* cited by examiner

CORRECTION OF NON-IMAGING THERMAL MEASUREMENT DEVICES

CROSS-REFERENCE TO RELATED APPLICATIONS

This application claim priority to U.S. Provisional Application Nos. 62/582,895, filed on Nov. 7, 2017, 62/633,487, filed on Feb. 21, 2018 and 62/643,457, filed on Mar. 15, 2018, the disclosures of which are hereby incorporated by reference in their entirety and for all purposes.

BACKGROUND OF THE INVENTION

Additive manufacturing, or the sequential assembly or construction of a part through the combination of material addition and applied energy, takes on many forms. Additive manufacturing can be carried out using any of a number of various processes that involve the formation of a three dimensional part of virtually any shape. The various processes have in common the sintering, curing or melting of liquid, powdered or granular raw material, layer by layer using ultraviolet light, high powered laser, or electron beam, respectively. Despite the improvements made in additive manufacturing, there is a need in the art for improved methods and systems related to additive manufacturing.

SUMMARY OF THE INVENTION

The described embodiments are related to a large subcategory of additive manufacturing, which involves using an energy source that takes the form of a moving region of intense thermal energy. Such energy sources are referred to hereinafter as heat sources. In the event that this thermal energy causes physical melting of the added material, then these processes are known broadly as welding processes. In welding processes, the material, which is incrementally and sequentially added, is melted by the heat source in a manner similar to a fusion weld. When the added material takes the form of layers of powder, after each incremental layer of powder material is sequentially added to the part being constructed, the heat source melts the incrementally added powder by welding regions of the powder layer, creating a moving molten region, hereinafter referred to as the weld pool, so that upon solidification they become part of the previously sequentially added and melted and solidified layers below the new layer that includes the part being constructed.

An additive manufacturing method is disclosed and includes the following: collecting temperature data describing temperature changes across a surface of a material during an additive manufacturing operation in which the material is heated by a heat source, wherein the temperature data is generated using a non-imaging optical sensor having a defined field of view; estimating a size of a hot spot corresponding to a hottest region formed on the surface by the heat source; estimating a size of a heated region corresponding to a locus of points within the field of view that contribute to the temperature data; and correcting the temperature data based on the estimated sizes of the hot spot and the heated region.

An additive manufacturing system is disclosed and includes the following: a heat source; a non-imaging optical sensor configured to measure temperatures across a surface of a material during an additive manufacturing operation in which the material is heated by the heat source, wherein the optical sensor has a defined field of view; and at least one processor configured to collect temperature data from the optical sensor, the at least one processor being further configured to: estimate a size of a hot spot corresponding to a hottest region formed on the surface by the heat source; estimate a size of a heated region corresponding to a locus of points within the field of view that contribute to the temperature data; and correct the temperature data based on the estimated sizes of the hot spot and the heated region.

An additive manufacturing method is disclosed and includes the following: heating a powder distributed across a powder bed, using a heat source; measuring heat across a surface of the powder bed using a non-imaging optical sensor having a defined field of view; estimating an area of a hot spot corresponding to a hottest region formed on the surface by the heat source; estimating an area of a heated region corresponding to a locus of points within the field of view that contribute to the measured heat, wherein the estimate tracks changes in the area of the heated region caused by temporal and spatial variations in operating parameters of the heat source; and scaling a measured temperature by a correction factor calculated based on the estimated areas of the hot spot and the heated region.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

The present disclosure relates to correction of thermal measurements in additive manufacturing processes. More specifically, the thermal measurements are taken during additive manufacturing and using a non-imaging optical sensor such as a pyrometer. Non-imaging sensors are typically limited to a single sensor element, for example a single photodiode. The sensor element can only output a signal that corresponds to the temperature at a region where the sensor element is pointed, but cannot by itself form an image of the region being measured. The example embodiments described herein may be applied to both Lagrangian and Eulerian sensors. Eulerian sensors operate within a Eulerian frame of reference by looking at values associated with specific points in space at given intervals in time. A Eulerian sensor is typically fixed into position facing a surface being measured. This is analogous to sitting on a riverbank and watching the river go by. By contrast, a Lagrangian frame of reference looks at physical quantities associated with the transport phenomenon along lines of flow in the flowfield or in the medium itself, i.e. "moving with" the transport phenomenon. Thus, a Lagrangian sensor might be affixed to a moving heat source or receive light input that follows the movement of the heat source. This can be thought of as analogous to sitting in a boat and observing the river as you are moving with the flow of the river.

Temperature and other data can be collected to make adjustments to an additive manufacturing process while the process is being performed or to analyze the results of the process afterwards. Thermal measurement can be performed using pyrometers, charge-coupled device (CCD) arrays, thermographic cameras, or other optical devices. Non-imaging devices such as photodiodes and pyrometers are not as accurate as devices that form a one-dimensional (1D) or two-dimensional (2D) image of the region being measured. An image means any light pattern that is projected on such a sensor array through a series of optics such as lenses, mirrors, gratings, etc. Non-imaging devices therefore often require calibration or temperature correction. Accordingly, embodiments of the present invention provide methods and systems for improving the accuracy of thermal measurements produced by non-imaging devices.

Additive Manufacturing System With Optical Sensors

Figure 1:
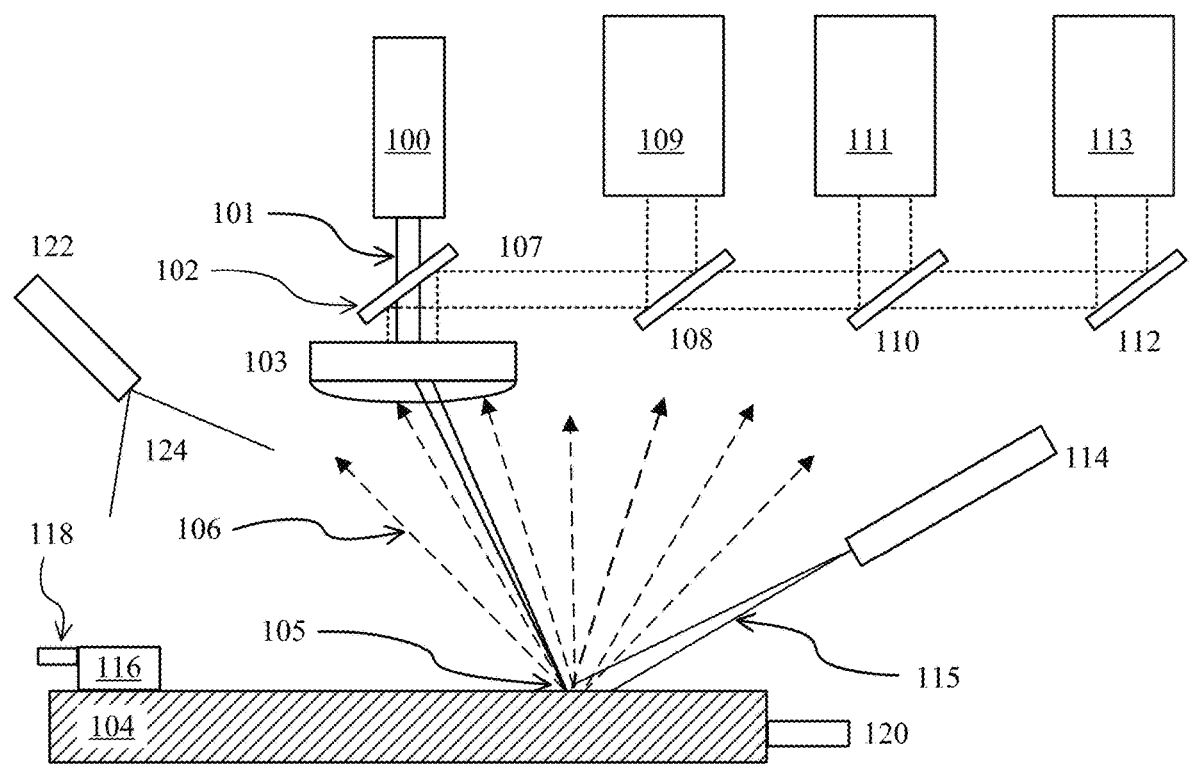
FIG. 1 is a schematic illustration of a system with an intense heat source, in this specific instance a laser beam.

FIG. 1 is a schematic illustration of an additive manufacturing system that includes both Lagrangian and Eulerian sensors. The system includes a heat source 100, in this instance a laser. The beam 101 emitted by heat source 100 originates at the laser head and passes through a partially reflective optic 102. This optic 102 is designed to be essentially fully transmissive at the specific wavelength that the laser operates, and reflective at other optical wavelengths. Generally the laser wavelength will be infrared or near-infrared, or typically wavelengths of 1000 nm or greater. The laser can include a scanning head 103 that consists of x and y positioning galvanometers as well as a focus lens, such as an f-theta lens. The beam 101 is therefore focused and strikes a workpiece 104 at a given location 105, thus generating a molten region on the workpiece 104. The heated region results in optical radiation 106 being emitted isotropically and uniformly over a large solid angle. Some of this optical radiation 106 will make its way back through the scanning head 103 and is reflected by the partially reflective optic 102.

This reflected optical beam 107 then makes its way through a series of analytical Lagrangian instruments 109, 111 and 113. A beam splitter 108 sends a portion of the beam to a photodiode 109. Photodiode 109 can be capable of sensing a range of frequencies at a high enough speed and recording rate to detect possible anomalies occurring during a deposition process, i.e. sudden departures from an average or mean intensity level. The remaining portion of the reflected optical beam 107 then goes to another beam splitter 110 and a portion of this beam is collected by a pyrometer 111. The pyrometer 111 may integrate this signal over some time interval in order to assign a temperature to the light thus collected. The signal should be corrected for the various optical attenuations that have occurred through beam splitting as well as the correction for the remote location of the molten region 105 on the workpiece 104 that resulted in the optical emission 106 of which a portion 107 was collected. Lastly the remaining portion of the reflected optical beam 107 is directed by a mirror 112 into a high speed optical imaging sensor 113 which could be a camera, or some other kind of linear or area CCD array or other imaging array. This optical imaging sensor 113 captures a 1D or 2D image that correlates to the size of the molten region. By using a relatively low resolution sensor 113, sensor 113 can be configured to record data at extremely high frame rates, so that sensor 113 is capable of detecting very transient temperature excursions occurring during a build process.

In addition to the various sensors in the Lagrangian reference frame, the system may perform measurements in a Eulerian reference frame using instruments 114 and 122. The instrument 114 is a stationary pyrometer 114 that independently measures temperature. The field of view (FOV) 115 of the stationary Eulerian pyrometer 114 is suitably chosen so that it matches the characteristic dimension of the molten zone 105 existing on the workpiece 104 and made by the focused laser beam 101 at the specific location to which the scanning head 103 displaced and focused the beam 101. Instrument 122 is a Eulerian photodiode 122 having an FOV 124, which can be configured to detect temperature changes in substantially any portion of the top surface of workpiece 104. In some embodiments, pyrometer 114 can be configured to provide calibration information to Eulerian photodiode 122, thereby allowing Eulerian photodiode 122 to accurately distinguish the temperature of any point on the top surface of workpiece 104.

In addition to the aforementioned sensors, additional sensors can be added to enhance measurements taken by the additive manufacturing sensor system. Device 116 can be a part of a mechanism that distributes layers of powder across a top surface of workpiece 104. Device 116 can include a contact sensor 118 that is configured to measure any disruptions to the spreading of the powder such as vibrations or jolts likely to result in an uneven application of the powder. In some embodiments, sensing of a vibration of device 116 can be used to accurately predict changes to the powder layer. The depicted sensing system can also include an acoustic sensor 120. Acoustic sensor 120 can be arranged along one side of the build platform so that as workpiece 104 is built up acoustic sensor 120 can be configured to listen for the formation of micro-cracks within workpiece 104. Acoustic sensor 120 can be calibrated to determine various characteristics of micro-cracking within workpiece 104. Microcracking can be caused from many things but in particular from improper cooling rates.

Figure 2:
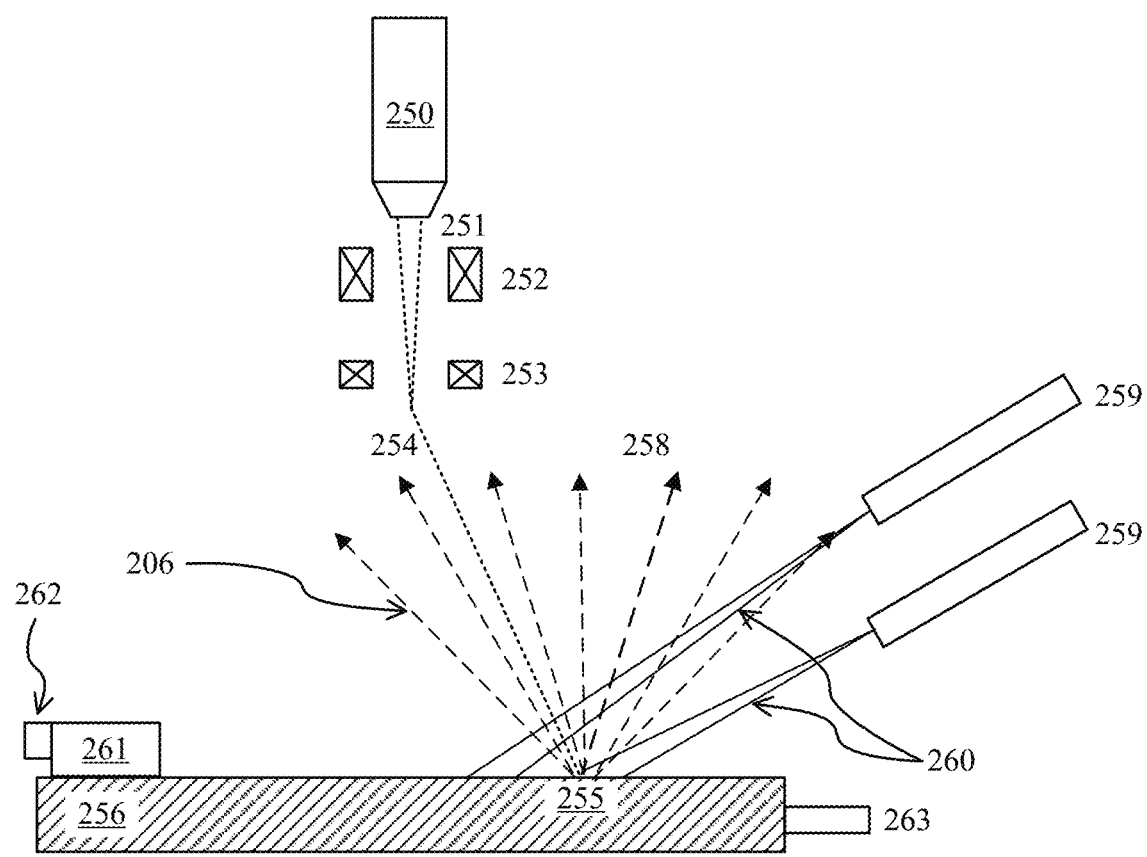
FIG. 2 is a schematic illustration of a system with an intense heat source, in this specific instance an electron beam.

FIG. 2 is a schematic illustration of an additive manufacturing system in which the heat source is an electron beam. The system of FIG. 2 includes an electron beam gun 250, which generates an electron beam 251 that is focused by an electromagnetic focusing system 252 and is then deflected by an electromagnetic deflection system 253, resulting in a finely focused and deflected electron beam 254, which creates a hot beam-material interaction zone 255 on a workpiece 256. Optical energy is emitted 258, 206 which could be collected by a series of sensors 259, each with their own respective FOV 260 which could be locally isolated to the interaction region 255 or could encompass the entire build area of the workpiece 256. At least some of the sensors 259 may be Lagrangian sensors with their own optical tracking and scanning system to follow the electron beam 254 as it moves across the build area of the workpiece 256. Regardless of whether or not these sensors 259 have optical tracking, the sensors 259 could consist of pyrometers, photodiodes, spectrometers, and high or low speed cameras operating in the visible or infrared (IR) spectral regions. The sensors 259 could also be sensors which combine a series of physical measurement modalities such as a laser ultrasonic sensor which could actively excite or "ping" the deposit with one laser beam and then use a laser interferometer to measure the resultant ultrasonic waves or "ringing" of the structure in order to measure or predict mechanical properties or mechanical integrity of the deposit as it is being built. Additionally, there could be contact sensors 262 on a mechanical device 261, which spreads the powders. Contact sensors 262 could be accelerometers, vibration sensors, etc. Lastly there could be other types of sensors 263. These could include contact sensors such as thermocouples to measure macro thermal fields or could include acoustic emission sensors which could detect cracking and other metallurgical phenomena occurring in the deposit as it is being built. In some embodiments, one or more thermocouples could be used to calibrate temperature data gathered by sensors 259. The sensors described in conjunction with FIGS. 1 and 2 can be used in the described ways to characterize performance of any additive manufacturing process involving sequential material build up.

Figure 3:
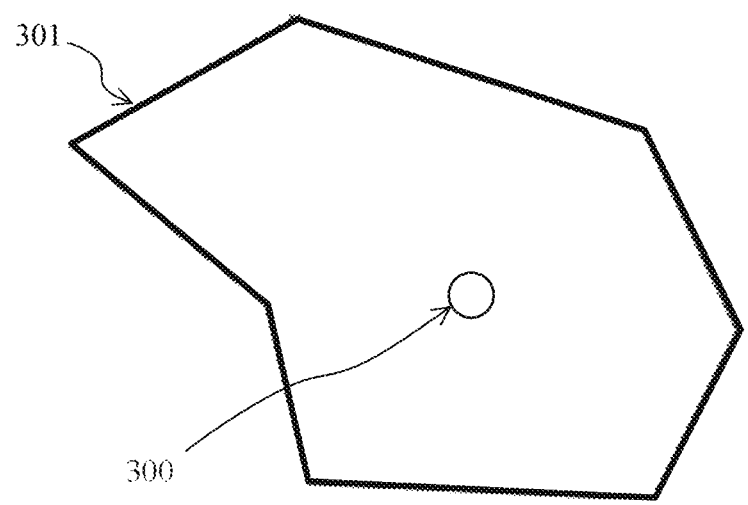
FIG. 3 is an illustration of a typical field of view for a pyrometer.

The Heated Region and Hot Spot, as Seen from the Field of View of an Optical Sensor FIG. 3 is an illustration of a typical FOV 300 for a pyrometer being used to measure the temperature of a surface 301. The FOV 300 is made as small as possible in comparison to the area of the surface 301. Generally, a smaller FOV provides a better indication of the temperature at a precise location on the surface.

Figure 4:
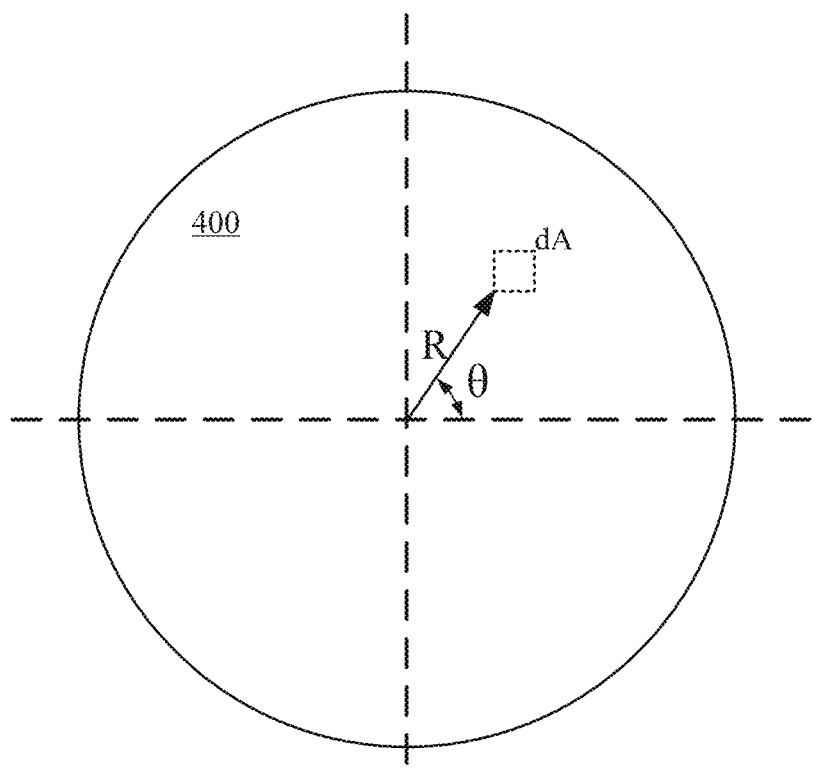
FIG. 4 shows an exemplary field of view of a pyrometer in an additive manufacturing environment.

FIG. 4 shows an exemplary FOV 400 of a pyrometer in an additive manufacturing environment. In contrast to FIG. 3, the FOV in FIG. 4 is much larger than the object being measured. The object in this case refers to a molten region plus all the other material within the FOV that is hot enough to contribute to a signal, i.e., hot enough to radiate over a frequency or range of frequencies that will be detectable by the pyrometer, and therefore contribute to temperature data produced by the pyrometer. When the temperature field within FOV 400 is variable and is a function of location as well as time, it may be assumed that each individual area element will contribute to the overall averaged temperature that is observed in proportion to its area as a fraction of the total area of the pyrometer FOV. The small differential area is schematically indicated in FIG. 4. The FOV 400 may include a multitude of smaller areas dA that are radiating. In general these areas are dispersed at a given radius R from the center of the FOV and at a certain angular orientation $\theta$ within the FOV of the pyrometer. Furthermore, each individual area may have a different emissivity that is a function of temperature.

Figure 5:
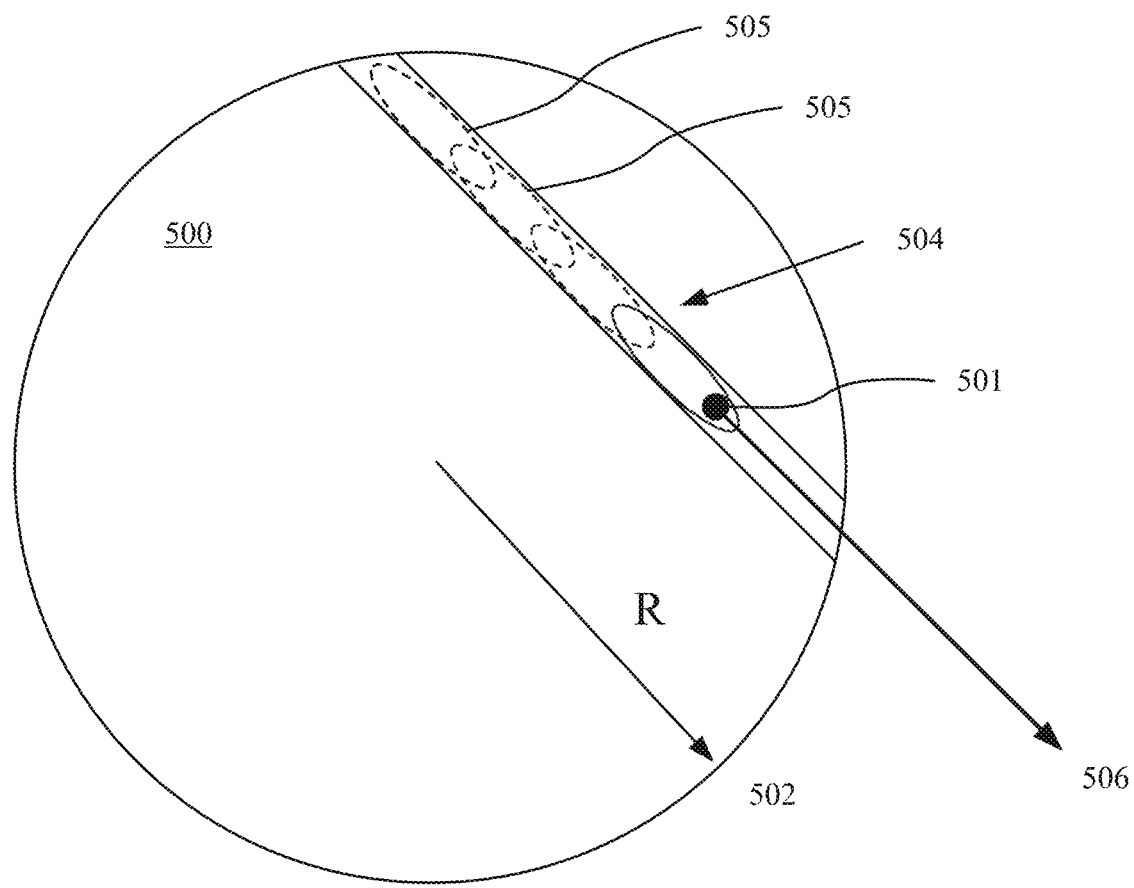
FIG. 5 shows a composite representation of a field of view of a Eulerian pyrometer, including a track of thermally affected and melted material formed over time by a moving heat source.

FIG. 5 schematically shows a composite representation of an FOV 500 of a Eulerian pyrometer while it monitors a portion of an additive manufacturing operation. The FOV 500 of the pyrometer is shown as a circular FOV with a radius R 502. A heat source is currently positioned so as to direct its energy into a region 501. Since the energy is focused upon it, the region 501 is the hottest region within the FOV 500, and may therefore be referred to as a "hot spot". Because the sensor is Eulerian, the hot spot will be observed to move over time as the heat source passes along a track 504 in direction 506. The heat source fuses metal powder positioned along track 504 by rapidly liquefying the metal powder and then allowing the liquefied powder to cool and solidify to form part of a workpiece being manufactured. FIG. 5 also illustrates heated regions 505, which represent regions of the build plane receiving a sufficient amount of heat to contribute to sensor readings of the pyrometer at four sequential periods of time. Track 504 can vary in size, area and location where it intersects the FOV 500 depending on parameters of the heat source and material properties of the metal powder. The heat source is not an instantaneous heat source, i.e. it is not instantly turning on and releasing a finite amount of heat instantaneously. Rather, the heat source is a moving, continuous heat source. Different areas within the FOV are constantly increasing and decreasing in temperature as the heat source is moving through the FOV, sweeping out the track 504. Therefore, the observed temperature should be interpreted as a time-integrated average of the time-dependent thermal behavior of the hot and cold regions—each weighted by their area fractions.

Figure 6A:
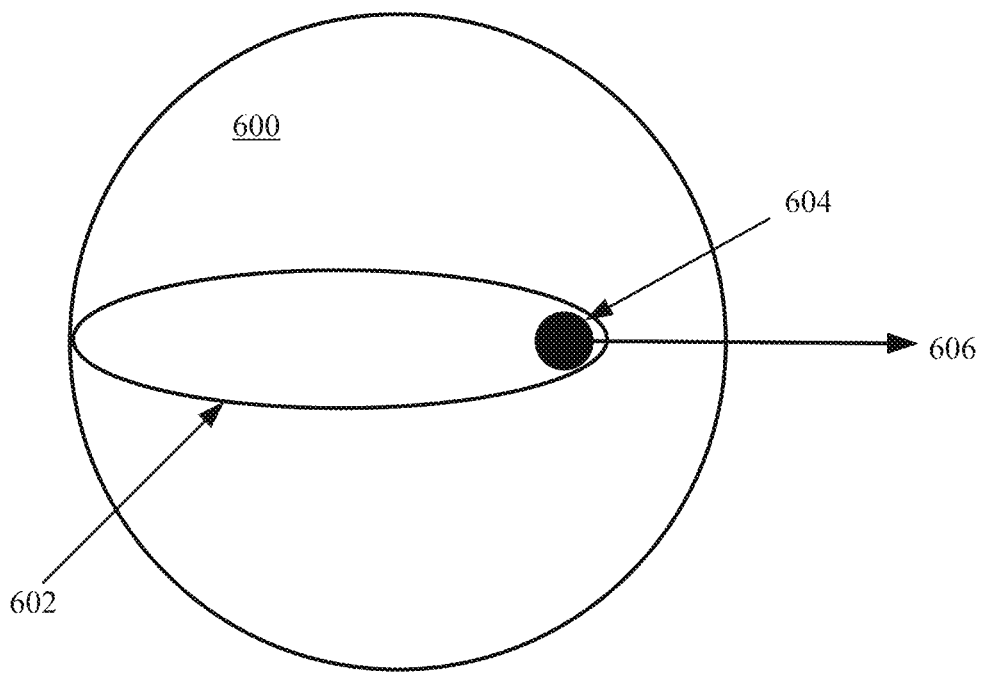
FIG. 6A shows an instantaneous field of view of a Lagrangian pyrometer and a thermally affected region.

FIG. 6A shows an instantaneous FOV 600 of a pyrometer operating in a Lagrangian frame of reference and depicts a thermally affected region 602 from which the pyrometer is able to detect radiated heat. FIG. 6A represents a moment in time during which a heat source is moving along direction 606 and directing its energy into a region 604. The region 604 corresponds to a hot spot and energy delivered to region 604 by the heat source liquefies the metal powder within and adjacent to region 604 to form a melt pool.

Because the sensor is Lagrangian, the hot spot 604 will be substantially fixed in position within instantaneous FOV 600. Surrounding the hot spot 604 are cooler regions that are still hot enough to be detected by the pyrometer, but are not necessarily molten. Thus, the locus of points which contribute to the signal produced by the pyrometer includes the hot spot and these cooler regions, and defines what is referred to herein as a "heated region" and is indicated by thermally affected region 602. Beyond the heated region are areas that are too cool to be detected by the pyrometer, including regions that are at an ambient temperature of the material being heated and heated areas that are slightly above the ambient temperature of the material.

Figure 6B:
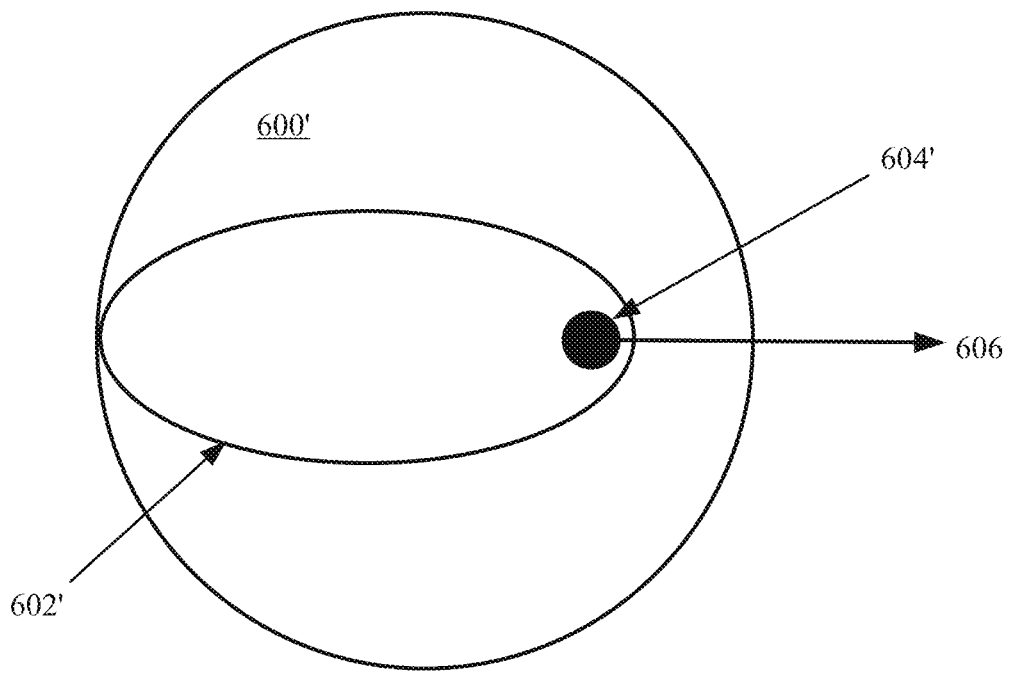
FIG. 6B shows another instantaneous field of view of a Lagrangian pyrometer monitoring a larger thermally affected region.

FIG. 6B shows an instantaneous FOV 600' for the pyrometer of FIG. 6A. The FOV 600' includes a hot spot 604' located at the same position as hot spot 604 since the frame of reference of the sensor tracks the movement of the heat source. In comparison to FIG. 6A, the thermally affected region 602' is significantly larger than the thermally affected region 602. There are various reasons why the thermally affected region would become larger. These reasons are described in further detail in the next section, but to summarize, there are factors that contribute to the size of the thermally affected region. These factors can be divided into two categories, one pertaining to the operating parameters or characteristics of the heat source and the second pertaining to the characteristics of the material(s), in particular the material being heated. A few possibilities for why the size of the thermally affected region would increase are an increase in the power output or travel speed of the heat source, or a switch to a material with a higher melting point. In addition to changing the size of the thermally affected region, some factors may also influence the overall shape of, or the distribution of heat within, the thermally affected region. For example, it is possible to maintain the same shape and position, even the same size, but have a different allocation of temperatures within the thermally affected region. Conventional temperature conversion processes do not take these changes to the thermally affected region into consideration. Consequently the resulting observed temperature values can be extremely inaccurate.

Figure 7A:
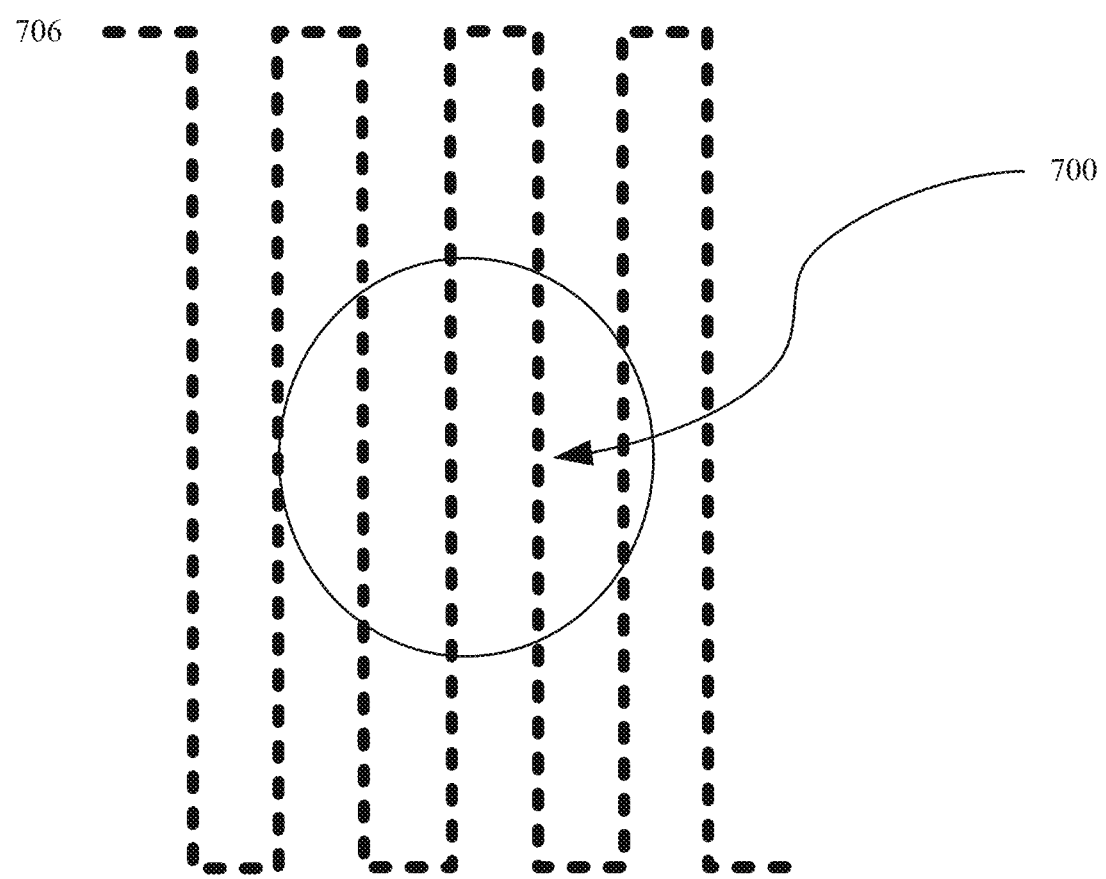
FIGS. 7A-7C show exemplary scan patterns that can be traversed by a heat source.
Figure 7B:
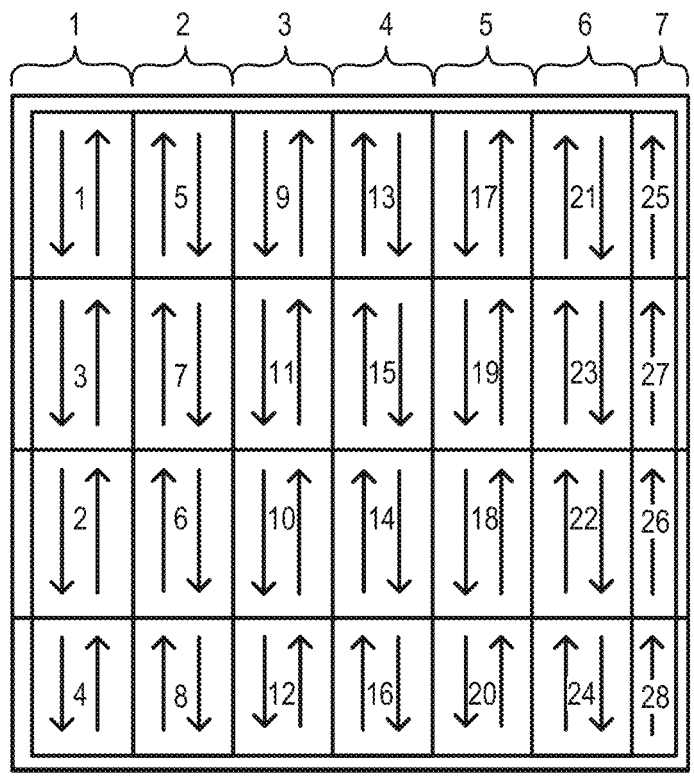
Figure 7C:
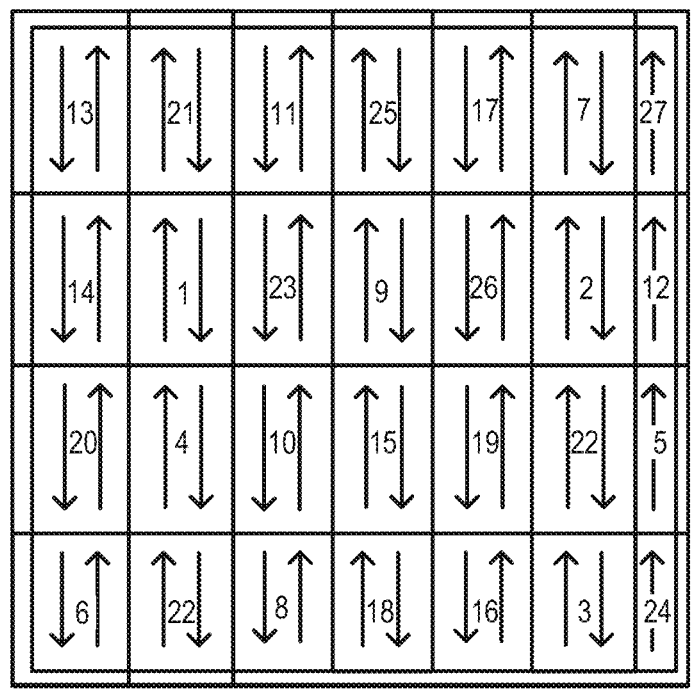

FIGS. 7A-7C show exemplary scan patterns that can be traversed by a heat source. FIG. 7A shows an exemplary scan pattern 706. As depicted, FOV 700 can represent a relatively small portion of scan pattern 706 and consequently, can only accurately quantify heating and cooling occurring within FOV 700. As discussed earlier, other scan patterns are possible and can include tighter or looser scan patterns performed at various speeds with various power outputs. The scan rate, power and scan pattern all have an effect upon how much energy gets delivered during the additive manufacturing operation.

FIG. 7B shows how the scan pattern can be broken into checkerboards which are scanned sequentially left to right and top to bottom. The numbers in each checkerboard indicate the order in which each checkerboard is scanned. In FIG. 7C, the same checkboard pattern is shown, but now the scan order for the individual checkerboards is randomized. Irrespective of the specific scanning pattern or scanning strategy involved, it is seen that the scanning process may involve many short, discrete scan lengths, with a start and a stop and a path length.

If a scan pattern similar to the ones depicted in FIGS. 7B or 7C were being monitored by a stationary/Eulerian optical sensor, the data collected by the sensor could represent multiple scans. For example, the optical sensor may produce a raw signal that varies over time, with multiple peaks or spikes in the signal, each peak representing a specific scan over a specific path that extends across the sensor FOV. The raw signal, which may be a voltage, varies in direct correspondence to the intensity of the light emitted by the material, and is a function of the path length. At the start of each scan, the signal may be small or even zero because the heat source has just been turned on or has just been applied to a new or unheated region of the material. As the scan progresses the material generally becomes hotter and emits more light, so the signal will increase. There would of course be a natural range and scatter in the raw signal as the light intensity varies throughout the process due to the very chaotic nature of the heat source/powder interactions as well as the chaotic motion of the molten material and the changing geometrical view factor from this small hot spot to the optical sensor.

Estimating the Heated Region and Thermal Field

Factors that contribute to the size and shape of the heated region include various operating parameters of the heat source and various physical properties of the material being heated. In FIG. 6A the heated region 602 is depicted as an oval. However, the actual shape of the heated region may vary depending on the operating parameters of the heat source including, for example, scan pattern, travel speed, and power output, as well as physical properties of the material being heated. The size and shape of the heated region will change in correspondence to temporal or spatial variations in the operating parameters. As a simple example of a temporal variation, if the travel speed is increased, the heated region may become enlarged since the heat source will perform more scan passes across the FOV, reducing the amount of time particular portions of the material have before receiving more energy from the heat source. Conversely, decreasing the travel speed may reduce the heated region. Increasing the power output tends to increase the size of the heated region. Increasing the power output may also reduce or offset the effects of travel speed changes. As an example of a spatial variation, scan lines that are tighter, i.e. more closely spaced, may increase the overall size of the heated region since heat is more concentrated, while scan lines that are more loosely spaced may decrease the size since heating is more diffuse. It should be noted that many additive manufacturing operations can include large spatial and/or temporal variations in order to correctly form features of different sizes and shapes. For this reason, having a sensor capable of accurately monitoring energy input across a wide spectrum of variations is important to successfully identifying potential problems in an additive manufacturing operation.

Regarding the effects of travel speed, it is not always the case that a lower speed yields a smaller heated region or a higher speed yields a larger heated region. The effects may depend, for example, on whether the material consolidation mechanism is dominated by either capillary forces or inertial forces. To make this determination, a Capillary time and a Rayleigh time may be computed based on physical properties of the material being heated. The Capillary time is the time necessary for an interface to regain its equilibrium shape after a perturbation and is given by:

$$t_{CAP} = \frac{\eta L}{\sigma} \quad \text{Eq. (1)}$$

Where η is the viscosity, L is the characteristic length, and σ is the surface tension. Similarly the Rayleigh time is defined as the time required for the relation of the interface under the action of inertia and surface tension forces:

$$t_{RAY} = \sqrt{\frac{\rho L^3}{\sigma}} \quad \text{Eq. (2)}$$

Where ρ is the density, L is the characteristic length, and σ is the surface tension. If the Capillary time is much shorter than the Rayleigh time, the consolidation process after melting is dominated by inertial effects countered by surface tension as opposed to viscous effects. Beam interaction time may also be taken into consideration and can computed for various travel speeds. The beam interaction time decreases with increasing travel speed and, for low values of travel speed (e.g., 400 mm/s or less), is of the same order of magnitude as the Rayleigh time.

At higher travel speeds (e.g., 600 mm/s or more), the beam interaction time becomes shorter than the Rayleigh time and much shorter than the heat conduction time. Therefore the energy density per unit length along the path of the heat source drops, and the average temperature of the melt pool will cool. Therefore, the average signal measured by the sensor may drop with increasing travel speed at the point where the characteristic beam interaction time becomes smaller than the Rayleigh time. Thus, higher speeds may initially yield larger heated regions, but increasing the speed beyond a certain point will cause the heated region to shrink. The speed at which this reversal occurs depends on the physical properties of the material and the operating parameters of the heat source. A higher power output might increase the reversal point to, for example, 800 mm/s and might also reduce the rate at which the size of the heated region drops with further speed increases.

Another operating parameter that may affect the size and shape of the heated region is the angular orientation of the heat source relative to the surface of the material being heated. If the heat source is perpendicular to the surface, then the hot spot may be assumed to be perfectly circular. If the heat source is at an angle to the surface, then the hot spot will become distorted, for example into an oval. When the hot spot is distorted in this way, the heat is spread over a greater surface area, but is less concentrated per unit area, so the overall size of the heated region tends to be smaller.

The size of the heated region can be estimated using the contributing factors, for example, by inputting the operating parameters of the heat source into a thermal model along with other relevant information such as physical properties of the material being heated (e.g., emissivity, powder density, thermal conductivity, etc.). The thermal model can be a static model determined, for example, based on experimental observations of the various heated regions that are generated in response to different combinations of operating parameters and materials. In some embodiments, the thermal model is updated based on results observed during actual manufacturing. For example, the thermal model can be updated by a learning algorithm or a neural network that is initially trained using experimental data. The heated region can also be estimated with a reduced order model that uses fewer inputs or rougher approximations compared to the thermal model, or an analytical model that outputs values of the heated region based on a solution to a system of equations describing the heated region.

In some embodiments, the thermal model, reduced order model or analytical model estimates a thermal field produced in the material, then calculates the size of the heated region as a function of the thermal field. The thermal field describes the temperature distribution for that portion of the material which lies within the FOV of the sensor. The model may estimate the thermal field using the same contributing factors since the temperatures within the thermal field will change in correspondence to changes in the heated region. Thus the thermal field could be estimated based on factors such as the size of the beam of the heat source, thermal boundary conditions, other heat source operating parameters (scan pattern, travel speed, power output, orientation, etc.) and physical properties of the material (e.g., an emissivity, a density, or a thermal conductivity, of a layer of powder at the surface of the workpiece). Some of these factors may change over time and be applied differently across the surface of the workpiece. Accordingly, the thermal field will also change and can be estimated as a function of both space (e.g., a two-dimensional coordinate system) and time.

The thermal field can be expressed as a two-dimensional matrix of temperature values or scalar quantities representative of temperature, for example normalized temperature values. In some embodiments, the thermal field is estimated by inputting the contributing factors into a lookup table that is referenced in real-time during additive manufacturing. An advantage of using a lookup table is that there are no time consuming computations that need to be performed. The table can be stored locally in the system. Alternatively the table can be stored on a remote computer or storage device. If the thermal field estimate does not need to be performed in real-time, then a more time consuming estimation method can be used, for example a more accurate thermal model that runs on a neural network. In some embodiments, the thermal field is estimated as a three-dimensional volume that is mapped to a two-dimensional matrix, where the matrix entries correspond to points located within an area defined by the intersection between the volume and the build area of the workpiece.

Converting a Raw Signal to Observed Temperature

An example method will be described in which a raw signal from an optical sensor is converted to temperature values that are corrected based on emissivity, then further corrected based on the size of the heated region. The following discussion briefly explains how a raw signal from an optical sensor may be converted into temperature values.

Figure 8:
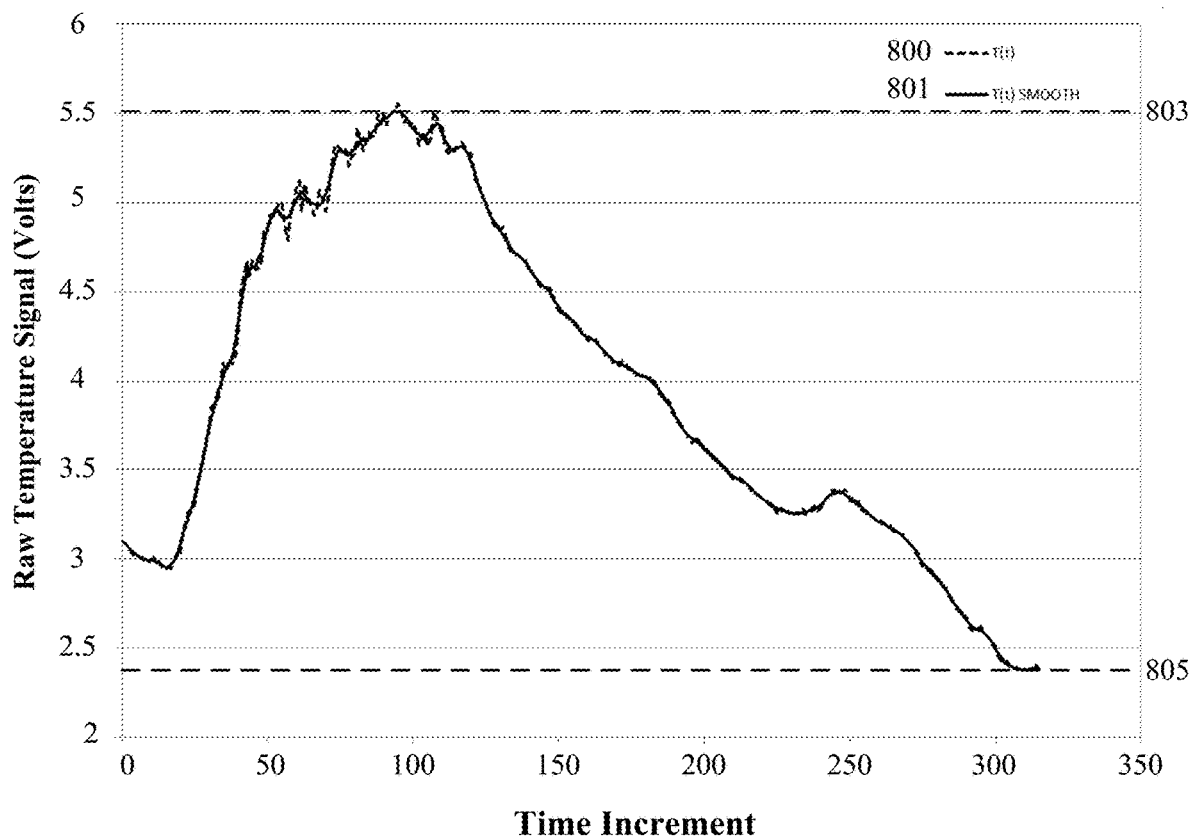
FIG. 8 shows a graph of a raw signal from an optical sensor.

FIG. 8 shows a raw thermal trace 800 of a signal produced by a pyrometer during an actual additive manufacturing process involving the sintering of an Inconel alley, specifically the nickel and chromium containing alloy IN-718. As shown in FIG. 8, the raw data trace 800 is signal-processed to form a smoothed trace 801 prior to temperature conversion. The traces 800 and 801 are shown as voltage signals over time. The time scale is shown in 50-unit increments, where each 50-unit increment corresponds to one microsecond, corresponding to a frequency of 50 kHz. The time scale in FIG. 8 was chosen to better show a single peak. However, as mentioned earlier, the signal produced by a Eulerian sensor may include multiple peaks, each peak corresponding to a single scan across the FOV. The scan begins around 0.5 microseconds, with an initial value of approximately 3 volts and reaches a maximum value 803 of approximately 5.5 volts around 2 microseconds. The heat source was initially within the FOV of the pyrometer. As the scan progressed, the heat source moved away from the FOV of the pyrometer, allowing the material located within the FOV to cool until the material was no longer hot enough to emit light that could be detected by the pyrometer. This cut-off occurred around 6 microseconds, at a voltage value 805 of approximately 2.3 volts. The values 803 and 805 may define upper and lower limits for evaluating the pyrometer signal. Limits may similarly be applied to signals from photodiodes and other types of optical sensors. For example, in estimating a size of a heated region the model or algorithm that estimates the heated region may take into consideration the limits for the particular sensor that produced the signal, and ignore temperatures that correspond to voltages beyond the limits, for example, temperatures associated with voltages greater than 5.5 volts and temperatures associated with voltages less than 2.3 volts.

The raw signal can be converted into observed temperature values using a Stefan-Boltzmann relationship, for example the classic Stefan-Boltzmann law in Equation (4) discussed below. The conversion may be based on an assumed emissivity of the material being heated and may be performed by processing circuitry of the sensor or by a separate processor in the system. In some embodiments, the same processor that converts the raw signal into observed temperatures also corrects the observed temperatures. Ways for correcting data collected by an optical sensor having an FOV substantially larger than the heated region, so as to estimate the true temperature from an observed temperature, are discussed below. In some embodiments, the observed temperature values are corrected prior to further correction based on an estimate of the size of the heated region. For example, the raw signal could be corrected based on emissivity to produce a corrected set of observed temperature values. At least one of the corrected temperature values could then be further corrected based on a heated region estimate. In some embodiments, the observed temperature values are corrected based on the heated region estimate before further correction based on other factors such as emissivity. These additional corrections are not always required. For example, in some embodiments the effects of emissivity may be mitigated by using a dual wavelength sensor that collects data for emitted light having one of two wavelengths. Since emissivity is wavelength dependent, the sensor could calculate the observed temperature based on an average of the signals from both wavelengths, without explicitly taking emissivity into consideration.

Correcting Temperature Based on the Size of the Heated Region

The temperature conversion process for an optical sensor is typically based on the area of the sensor's FOV which, as explained earlier, is much larger than the heated region in an additive manufacturing situation. Thus the temperature conversion takes into consideration areas that do not contribute to the signal of the sensor. As a result, the observed temperatures tend to be significantly lower than the actual temperature of the heated region. To correct this error, the observed temperatures can be scaled up by a correction factor. One possible correction factor is based on the assumption that the observed temperature underestimates the true temperature of the heated region by the ratio of the area of the heated region to the area of the field of view:

$$\varphi_{CORRECTION} = \frac{A_{FOV}}{A_{HEATED\ REGION}} \quad \text{Eq. (3)}$$

Where $A_{FOV}$ is the area of the field of view of the sensor and $A_{HEATED\ REGION}$ is the area of the heated region. For this correction factor to be valid, two assumptions must be true: (1) all points within the heated region contribute equally to the signal produced by the sensor and (2) the sensor can measure over all possible frequencies or wavelengths of emitted light. Neither assumption is actually true. The points within the heated region do not contribute equally to the radiated power from the heated region, and the sensor generally is unable to detect radiation at all wavelengths. Thus using the above correction factor will severely overestimate the actual temperature. As described below in connection with the method of FIG. 9, a more accurate correction factor can be obtained based on a relationship between the size of heated region and the size of the hot spot.

Figure 9:
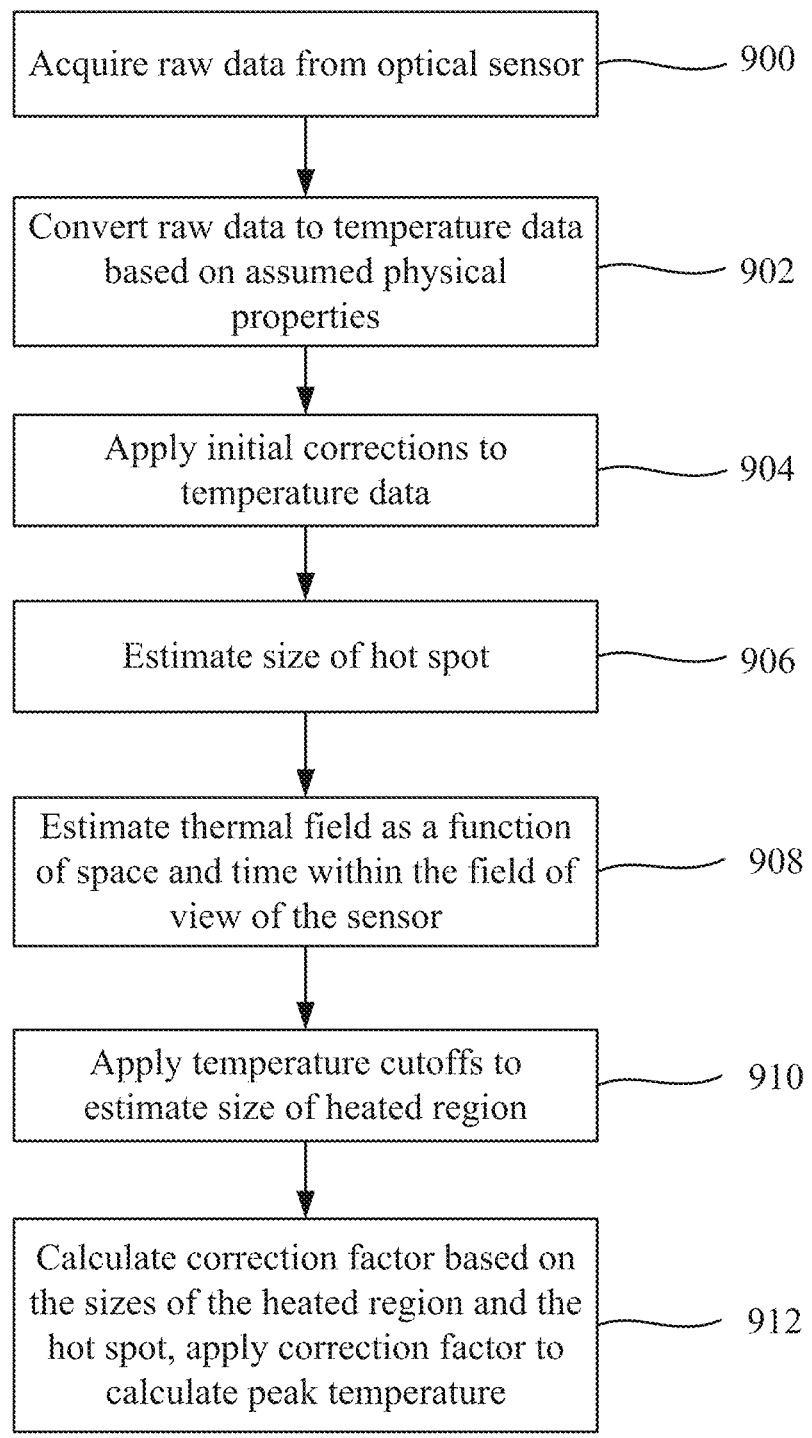
FIG. 9 shows a flowchart of a method for correcting observed temperature based on an estimated size of a heated region.

FIG. 9 shows a flow chart of a method for correcting temperature data collected by a non-imaging sensor in an additive manufacturing system. The data could be collected, for example, by one of the non-imaging optical sensors discussed earlier in connection with the systems of FIGS. 1 and 2. The method may be performed by at least one processor including, for example, a processor executing instructions stored on a computer readable medium. In some embodiments the processor is hardwired to perform at least part of the method. Thus the method may be implemented in hardware, software, or a combination of hardware and software. The method may performed during or after an additive manufacturing process from which the temperature data is collected. If the method is performed during additive manufacturing, corrected temperature values can be analyzed to make real-time adjustments to the additive manufacturing process including, for example, adjustments to one or more operating parameters of the heat source. If the method is applied after an additive manufacturing process has been completed, the corrected temperature values may be stored for recording keeping or subsequent analysis.

At 900 raw data is acquired from an optical sensor. Whether the sensor is Lagrangian or Eulerian, the sensor has a defined FOV. The size of the FOV is known or readily obtainable. For instance, the FOV of a typical pyrometer used for additive manufacturing is on the order of 1 mm. The data can be collected for a single scan of a laser or other heat source. Alternatively, the data may represent multiple scan passes across the FOV of the sensor, possibly at different speeds, orientations, scan patterns, or power outputs. The raw data may be obtained by sampling the raw signal produced by the optical sensor in response to emitted light.

At 902 the raw data is converted to temperature data based on assumed physical properties of the material being heated. For example, the raw data may include a set of voltage values that the sensor converts into corresponding temperature values based on an assumed emissivity of the material. The assumed emissivity could be a default assumption programmed or hardwired into the sensor or some other device that performs the conversion, or it could be a setting manually selected by a human operator.

At 904 initial corrections are applied to the temperature data. For example, the temperature data could be corrected based on differences between the assumed emissivity and a modeled or measured emissivity. In some embodiments, the initial correction may be performed on the raw data, i.e. before temperature conversion. Thus the initial correction might be applied in a voltage or current domain rather than a temperature domain.

At 906 the size of the hot spot is estimated. For purposes of estimating the peak temperature, it is safe to assume that the area of the hot spot matches that of the beam output by the heat source. For example, a typical beam diameter of a laser in an additive manufacturing system is on the order of 100 microns (0.1 mm). Thus the size of the hot spot might be estimated to be equal to the area of the typical laser, for example, $\pi(0.05)^2$. The beam size is typically a known or measurable quantity and can be obtained, for example, from documentation supplied by a manufacturer of the heat source.

At 908 the thermal field produced on the build area of the workpiece is estimated. As explained earlier, the thermal field can be estimated based on various contributing factors including operating parameters of the heat source and physical properties of the material, and can be expressed as a two-dimensional matrix of temperature values. A more accurate temperature correction process that makes use of the estimated thermal field is now described. First, the temperature values of the thermal field are translated into radiated power based on a Stefan-Boltzmann relationship obtained by modifying the classic Stefan-Boltzmann law as follows.

The Stefan-Boltzmann law describes the relationship between radiated power and temperature of a surface of a black body:

$$E = \varepsilon \cdot A \cdot \sigma \cdot T^4 \qquad \text{Eq. (4)}$$

Where ε is the surface emissivity, A is the area of the region at temperature T, σ is the Stefan-Boltzmann constant, and T is the temperature in degrees Kelvin. The Stefan-Boltzmann law is related to the Planck equation:

$$I(\omega, T) = \frac{2h\omega^3}{c^2} \cdot \frac{1}{\exp\left(\frac{h\omega}{kT} - 1\right)} \qquad \text{Eq. (5)}$$

Where I is the radiated power per unit area per unit solid angle per unit frequency, h is Planck's constant, ω is the frequency, k is the Boltzmann constant, c is the speed of light, and T is the absolute temperature.

The Stefan-Boltzmann law is typically derived by integrating the Planck equation over all frequencies and all solid angles:

$$\frac{P}{A} = \int_0^\infty \frac{2h\omega^3}{c^2} \cdot \frac{1}{\exp\left(\frac{h\omega}{kT} - 1\right)} \cdot d\omega \int d\Omega \qquad \text{Eq. (6)}$$

Where P/A is the power per unit area and the integration proceeds over all frequencies and all solid angles.

The assumption of uniform radiation over all frequencies is not correct for optical sensors in general. For example, pyrometers will detect only over a given frequency range, and therefore the correct equation would be represented by:

$$\frac{P}{A} = \int_{\omega_{LOWER}}^{\omega_{UPPER}} \frac{2h\omega^3}{c^2} \cdot \frac{1}{\exp\left(\frac{h\omega}{kT} - 1\right)} \cdot d\omega \int d\Omega \qquad \text{Eq. (7)}$$

This integral does not have an analytic solution as it is a form of the Bose-Einstein Integral but over a finite range of frequencies. However it will result in a Stefan-Boltzmann like law with an exponent other than 4:

$$E = \varepsilon \cdot A \cdot \sigma \cdot T^n \qquad \text{Eq. (8)}$$

The exponent n is some real number. For a narrow range of frequencies in the deep infrared spectrum, such as is typically the case for pyrometers and other optical sensors of practical interest in additive manufacturing, the value of n could be as high as 6 or 7.

Applying the modified Stefan-Boltzmann law of Eq. (8), the values of the thermal field can be converted into values that represent the radiated power observed by a hypothetical, ideal optical sensor. At 910, the heated region is then estimated by identifying all points in the thermal field that are within a specified range of the peak radiated power. The peak power occurs in the region directly illuminated by the heat source, i.e. the hot spot. The heated region may be identified, for example, as corresponding to all points that are within 50%, 25%, 10% or 5% of the peak power. The range may be determined as a function of the operating parameters of the heat source and the physical properties of the material. For example, if the powder has a higher melting temperature, then it needs to be heated to a higher temperature, creating a larger thermally affected region. Thus a 10% value might be used for a melting temperature of 400° C., whereas a 25% value might be used for a material with a melting temperature of 200° C. In this way, thermal modeling is used to estimate which portions of the FOV are hot enough to contribute to the sensor signal, by identifying points for which the radiated power is within a specified proportion of a peak radiated power of the thermal field.

At 912, once the heated region has been estimated, each observed temperature value can be scaled by the following correction factor to obtain a corresponding peak temperature:

$$\varphi_{CORRECTION} = \frac{A_{HEATED\ REGION}}{A_{HOT\ SPOT}} \qquad \text{Eq. (9)}$$

$$T_{MAX} = \varphi_{CORRECTION} \cdot T_{OBS} \qquad \text{Eq. (10)}$$

Where $A_{HOT\ SPOT}$ is the area of the hot spot, $T_{MAX}$ is the peak temperature and $T_{OBS}$ is the observed temperature.

Figure 10:
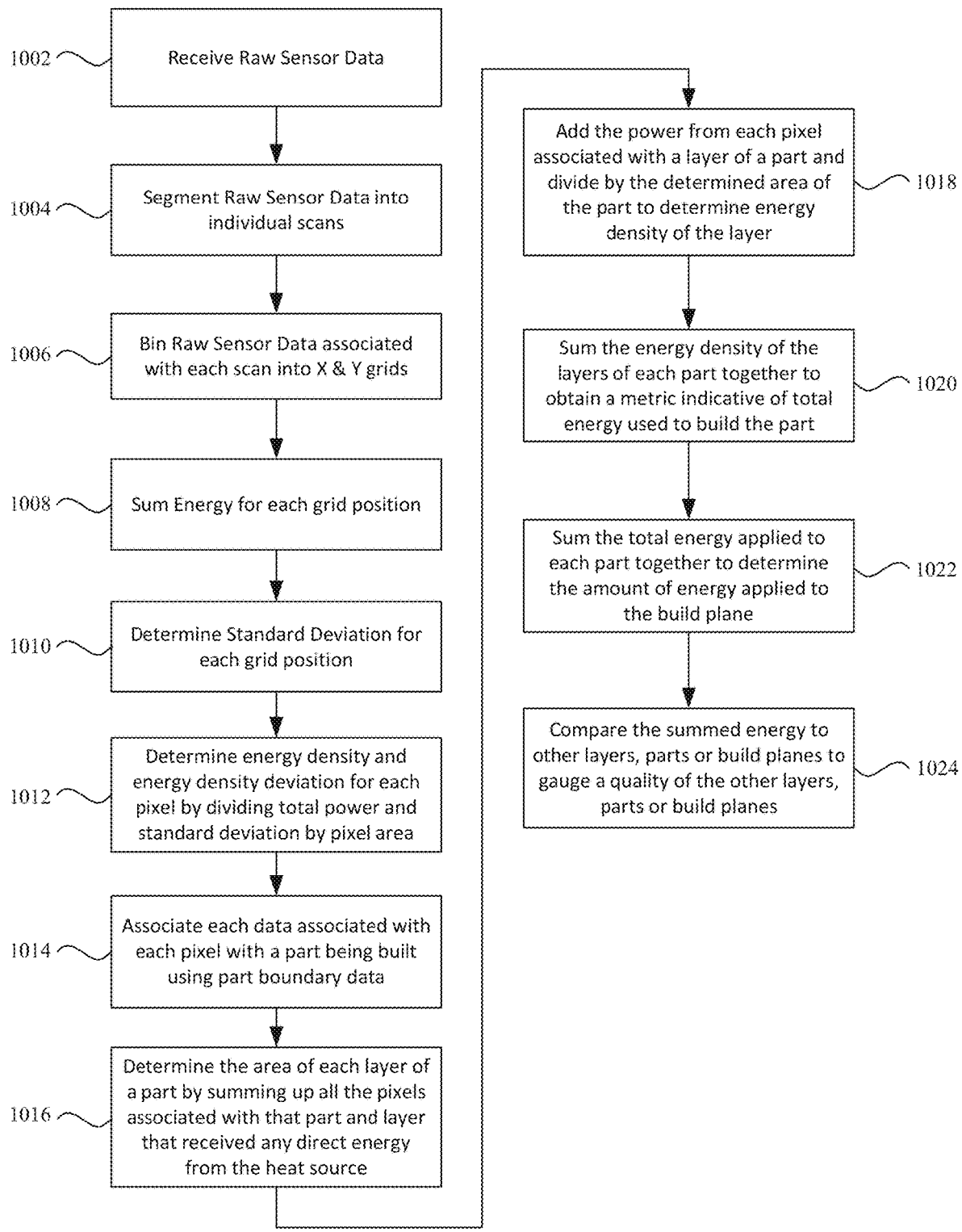
FIG. 10 shows a process in which data recorded by an optical sensor such as a non-imaging photodetector can be processed to characterize an additive manufacturing build process.

Incorporation of Size-Based Correction into an aggregation Based Analysis System FIG. 10 shows a process in which data recorded by an optical sensor such as a non-imaging photodetector can be processed to characterize an additive manufacturing build process. At 1002, raw sensor data is received that can include both build plane intensity data and energy source drive signals correlated together. At 1004, by comparing the drive signal and build plane intensity data, individual scans can be identified and located within the build plane. Generally the energy source drive signal will provide at least start and end positions from which the area across which the scan extends can be determined. At 1006, raw sensor data associated with an intensity or power of each scan can be binned into corresponding X & Y grid regions. In some embodiments, the raw intensity or power data can be converted into energy units by correlating the dwell time of each scan in a particular grid region. Each grid region can have a size corresponding to one or more pixels of an optical sensor monitoring the build plane. It should be noted that different coordinate systems, such as polar coordinates, could be used to store grid coordinates and that storage of coordinates should not be limited to Cartesian coordinates. In some embodiments, different scan types can be binned separately so that analysis can be performed solely on particular scan types. For example, an operator may want to focus on contour scans if those types of scans are most likely to include unwanted variations. At 1008, energy input at each grid region can be summed up so that a total amount of energy received at each grid region can be determined using equation (11).

$$E_{pd_m} = \sum_{n=1}^{pixel\ samples\ in\ grid\ cell} E_{pd_n} \qquad \text{Eq. (11)}$$

This summation can be performed just prior to adding a new layer of powder to the build plane or alternatively, summation may be delayed until a predetermined number of layers of powder have been deposited. For example, summation could be performed only after having deposited and fused portions of five or ten different layers of powder during an additive manufacturing process. In some embodiments, a sintered layer of powder can add about 40 microns to the thickness of a part; however this thickness will vary depending on a type of powder being used and a thickness of the powder layer.

At 1010, the standard deviation for the samples detected and associated with each grid region is determined. This can help to identify grid regions where the power readings vary by a smaller or greater amount. Variations in standard deviation can be indicative of problems with sensor performance and/or instances where one or more scans are missing or having power level far outside of normal operating parameters. Standard deviation can be determined using Equation (12).

$$E_{pd_{sm}} = \sqrt{\frac{1}{\text{\# sample-in-location}-1} \sum_{n=1}^{\text{sample-in-pixel}} (E_n - \bar{E})^2} \quad \text{Eq. (12)}$$

At 1012, a total energy density received at each grid region can be determined by dividing the power readings by the overall area of the grid region. In some embodiments, a grid region can have a square geometry with a length of about 250 microns. The energy density for each grid region can be determined using Equation (13).

$$E_{grid\ location} = \frac{\sum_{n=1}^{samples-in-location} E_{pd_n}}{A_{grid\ location}} \quad \text{Eq. (13)}$$

At 1014, when more than one part is being built, different grid regions can be associated with different parts. In some embodiments, a system can included stored part boundaries that can be used to quickly associate each grid region and its associated energy density with its respective part using the coordinates of the grid region and boundaries associated with each part.

At 1016, an area of each layer of a part can be determined. Where a layer includes voids or helps define internal cavities, substantial portions of the layer may not receive any energy. For this reason, the affected area can be calculated by summing only grid regions identified as receiving some amount of energy from the energy source. At 1018, the total amount of power received by the grid regions within the portion of the layer associated with the part can be summed up and divided by the affected area to determine energy density for that layer of the part. Area and energy density can be calculated using Equations (14) and (15).

$$A_{part} = \sum_{n=1}^{part\ pixel} 1(E_{pd_n} > 0) \quad \text{Eq. (14)}$$

$$IPQM_{part_{layer}} = \frac{\sum_{n=1}^{part\ grid\ locations} E_{pd_n}}{A_{part}} \quad \text{Eq. (15)}$$

At 1020, the energy density of each layer can be summed together to obtain a metric indicative of the overall amount of energy received by the part. The overall energy density of the part can then be compared with the energy density of other similar parts on the build plane. At 1022, the total energy from each part is summed up. This allows high level comparisons to be made between different builds. Build comparisons can be helpful in identifying systematic differences such as variations in powder and changes in overall power output. Finally at 1024, the summed energy values can be compared with other layers, parts or build planes to determine a quality of the other layers, parts or build planes.

Other metrics can be summed up or stored in the manner described in FIG. 10. For example, max temperature could be one of these metrics and the method described herein for performing temperature correction based on a calculated correction factor can be used to obtain a more accurate max temperature. The binned max temperature data could be used in many ways. For example, the max temperature values could be averaged for each grid region or the highest max temperature could be associated with each grid region. Alternatively, the mode of the top 5 or 10 percent of the max temperature readings could be associated with the grid region to avoid the situation where a single instance of a highly elevated max temperature throws off what would otherwise be a more nominal max temperature value.

It should be appreciated that the specific steps illustrated in FIG. 10 provide a particular method of characterizing an additive manufacturing build process according to another embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11A:
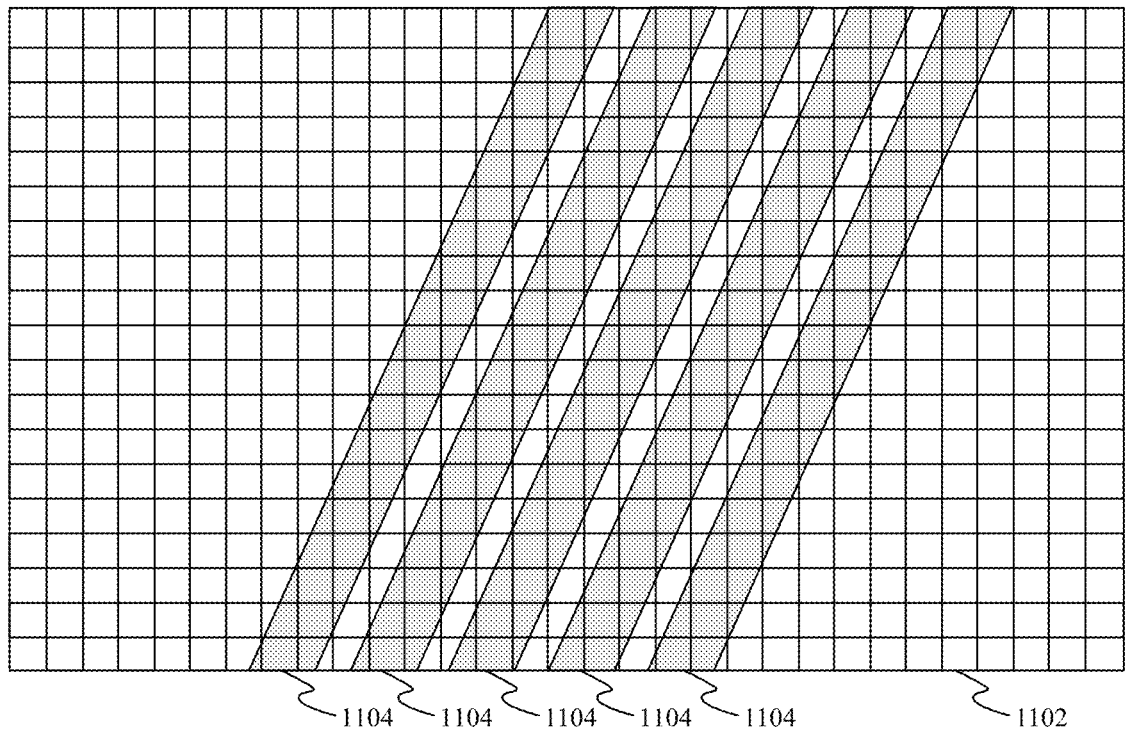
FIGS. 11A-11D show visual depictions indicating how multiple scans can contribute to the power introduced at individual grid regions.
Figure 11B:
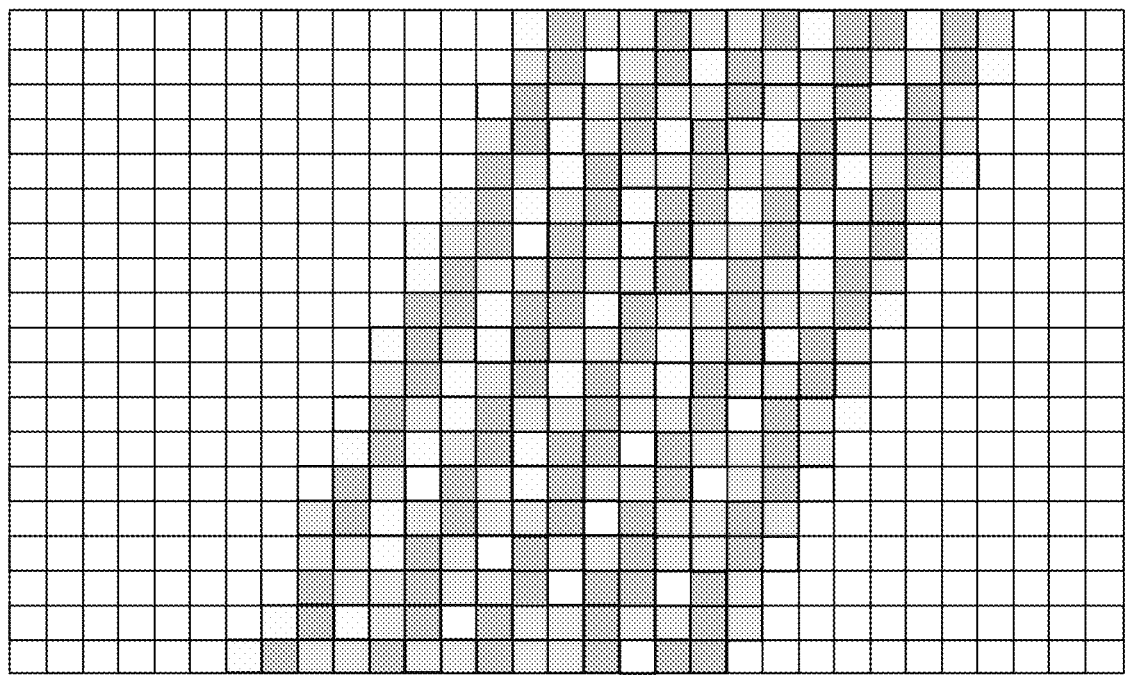

FIGS. 11A-11D show visual depictions indicating how multiple scans can contribute to the power introduced at individual grid regions. FIG. 11A depicts a grid pattern made up of multiple grid regions 1102 distributed across a portion of a part being built by an additive manufacturing system. FIG. 11A also depicts a first pattern of energy scans 1104 extending diagonally across a grid regions 1102. The first pattern of energy scans 1102 can be applied by a laser or other intense source of thermal energy scanning across grid 1104. FIG. 11B shows how the energy introduced across the part is represented in each of grid regions 1102 by a singular gray scale color representative of an amount of energy received where darker shades of gray correspond to greater amounts of energy. It should be noted that in some embodiments the size of grid regions 1102 can be reduced to obtain higher resolution data. Alternatively, the size of grid regions 1102 could be increased to reduce memory and processing power usage.

Figure 11C:
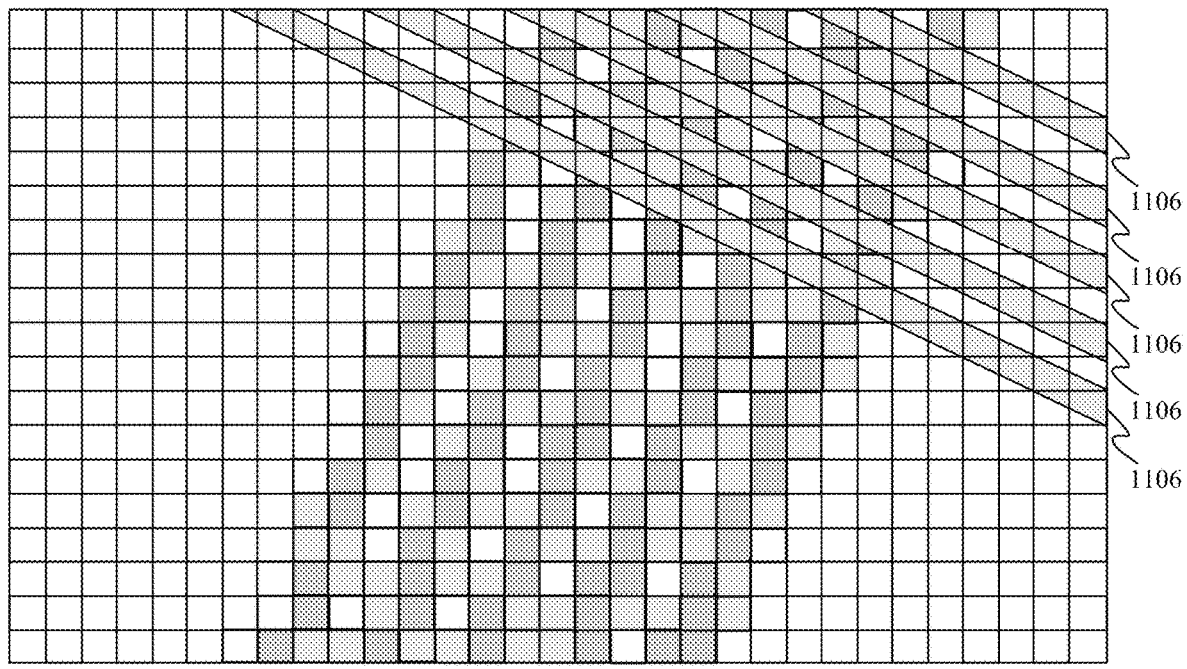
Figure 11D:
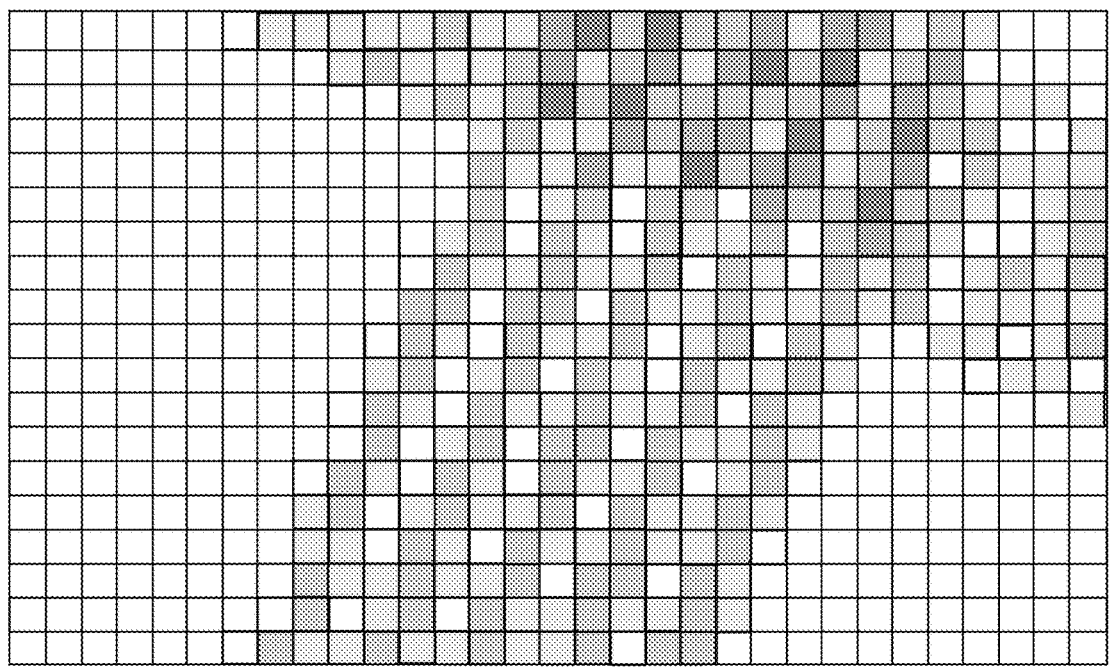

FIG. 11C shows a second pattern of energy scans 1106 overlapping with at least a portion of the energy scans of the first pattern of energy scans. As discussed in the text accompanying FIG. 8, where the first and second patterns of energy scans overlap, grid regions are shown in a darker shade to illustrate how energy from both scans has increased the amount of energy received over the overlapping scan patterns. Clearly, the method is not limited to two overlapping scans and could include many other additional scans that would get added together to fully represent energy received at each grid region.

Figure 12A:
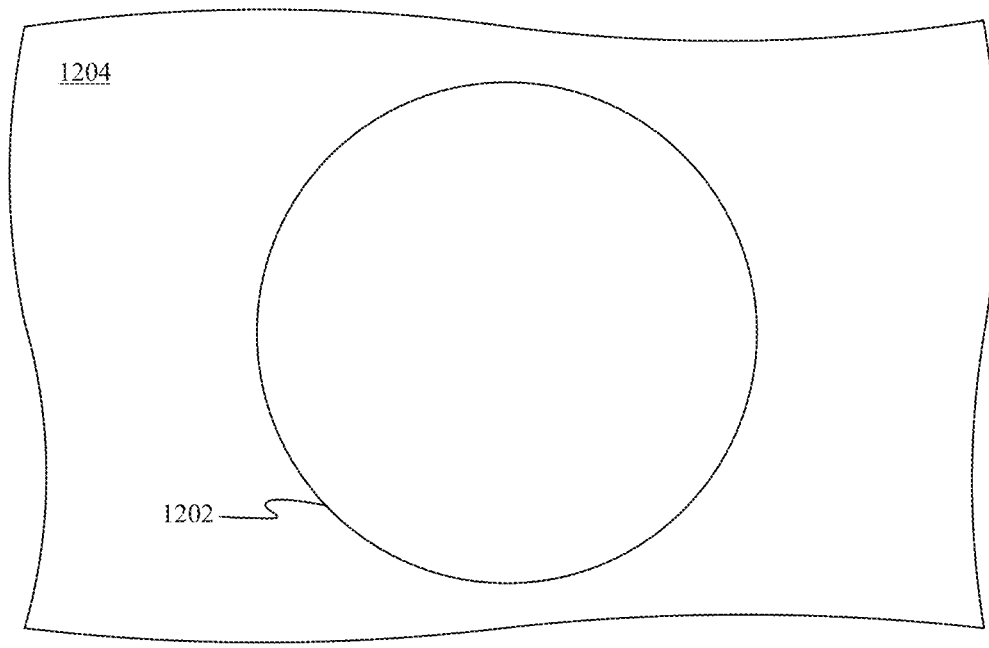
FIGS. 12A-12F illustrate how a grid can be dynamically created to characterize and control an additive manufacturing operation.

FIGS. 12A-12F illustrate how a grid can be dynamically created to characterize and control an additive manufacturing operation. FIG. 12A shows a top view of a cylindrical workpiece 1202 positioned upon a portion of a build plane

Figure 12B:
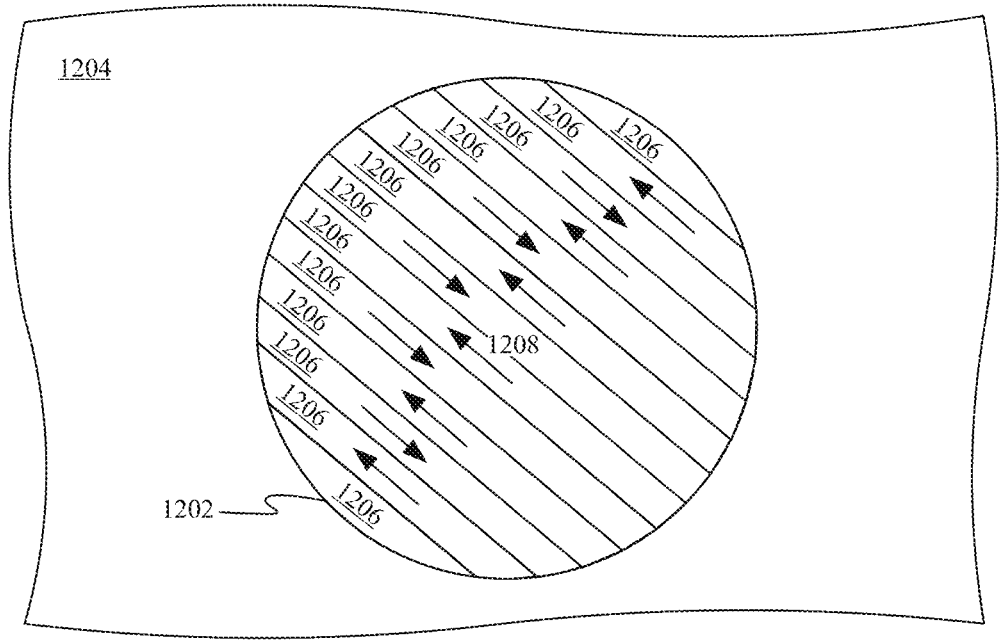

1204. Workpiece 1202 is shown as it undergoes an additive manufacturing operation. FIG. 12B shows how cylindrical workpiece 1202 can be divided into multiple tracks 1206 along which an energy source can melt powder distributed on an upper surface of cylindrical workpiece 1202. In some embodiments, the energy source can alternate directions 1206 as depicted while in other embodiments the energy source can always move in one direction. Furthermore a direction of tracks 1206 can vary from layer to layer in order to further randomize the orientation of scans used to build workpiece 1202.

Figure 12C:
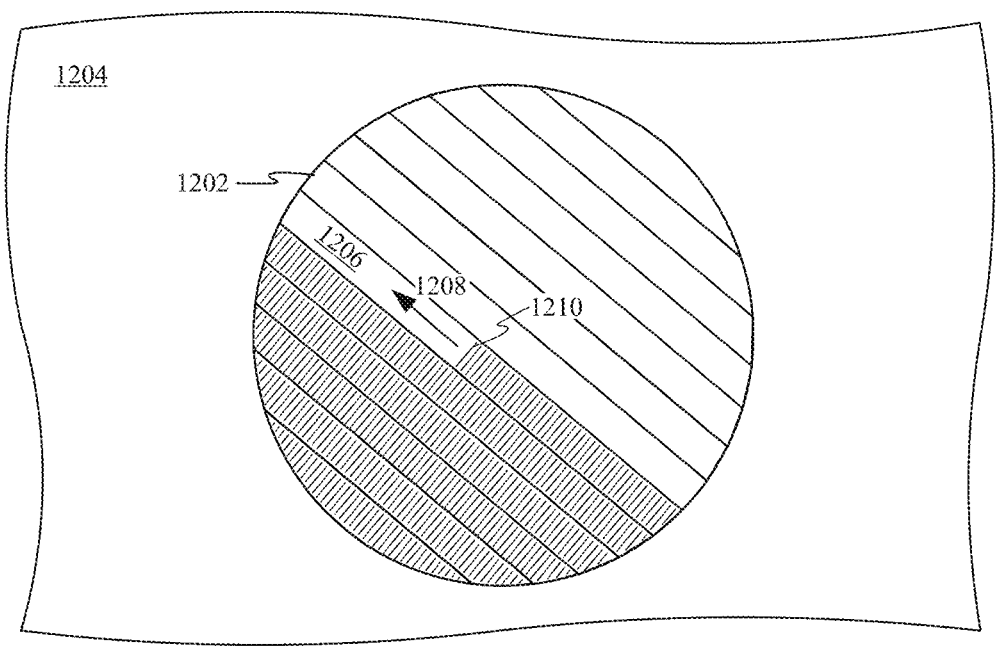

FIG. 12C shows an exemplary scan pattern for the energy source as it forms a portion of workpiece 1202. As indicated, by arrow 1208 a direction of movement of across workpiece 1202 of an exemplary energy source is diagonal. Individual scans 1210 of the energy source can be oriented in a direction perpendicular to the direction of movement of the energy source along track 1206 and extend entirely across track 1206. The energy source can turn off briefly between successive individual scans 1210. In some embodiments, a duty cycle of the energy source can be about 90% as it traverses each of tracks 1206. By employing this type of scan strategy, the energy source can cover a width of track 1206 as it traverses across workpiece 1202. In some embodiments, swath 1210 can have a width of about 5 mm. This can substantially reduce the number of tracks needed to form workpiece 1202 as in some embodiments a width of a melt pool generated by the energy source can be on the order of about 80 microns.

Figure 12D:
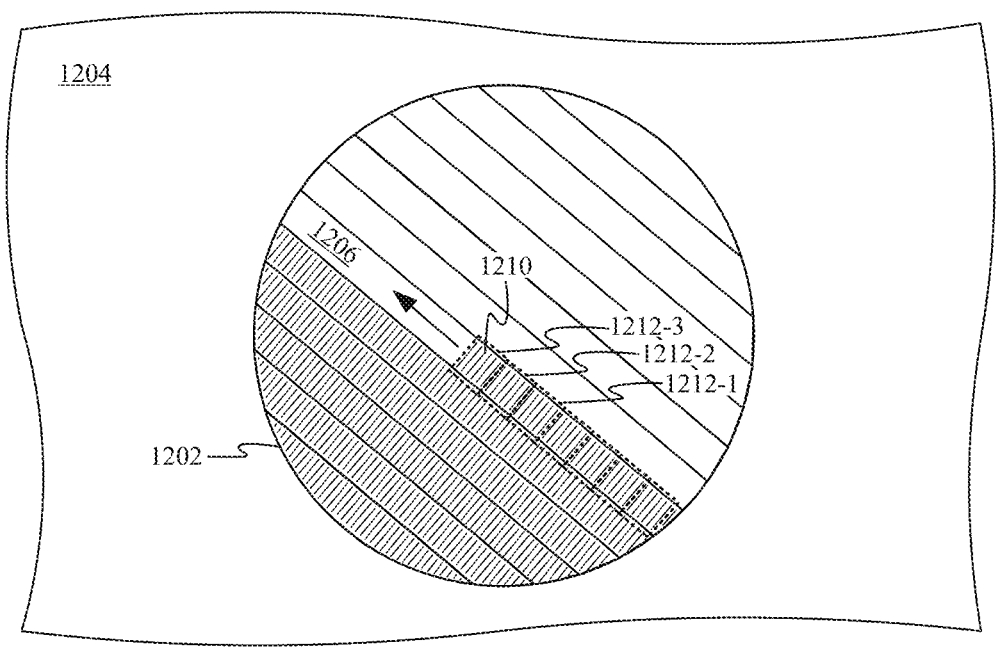
Figure 12E:
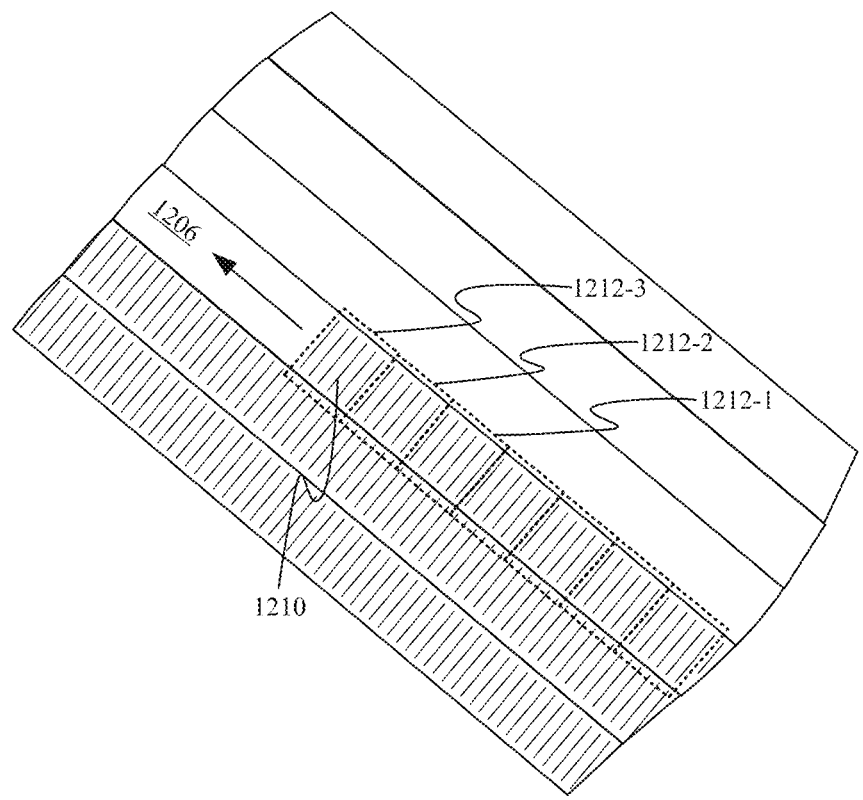

FIGS. 12D-12E show how grid regions 1212-1 through 1212-3 can be dynamically generated along each track 1206 and be sized to accommodate a width of each individual scan 1210. A precise position of subsequent scans can be forecast by the system by referencing energy source drive signals enroute to the energy source. In some embodiments, the width of grids 1212-1 through 1212-3 can match the length of individual scans 1210 or be within 10 or 20% of the length of individual scans 1210. Again, scan length of individual scans 1210 can be anticipated by referencing the energy source drive signals. In some embodiments, grid regions 1212-1 through 1212-3 can be square or rectangular in shape. A thermal energy density can be determined for each of grid regions 1212-1 through 1212-3 as the energy source continues along track 1206. In some embodiments, thermal energy density readings within grid region 1212-1 could be used to adjust an output of the energy source within the next grid region, grid region 1212-2 in this case. For example, if the thermal energy density readings generated by individual scans 1210 within grid region 1212-1 are substantially higher than expected, energy source power output can be reduced, a speed at which energy source scans across individual scans 1210 can be increased and/or spacing between individual scans 1210 can be increased within grid region 1212-2. These adjustments can be made as part of a closed loop control system. While FIG. 12E clearly shows only five individual scans 1210 are shown within each grid region 1212-1 through 1212-3, this is depicted in this manner for exemplary purposes only and the actual number of individual scans within a grid region 1212-1 through 1212-3 can be substantially higher or in some cases lower. For example, where the melt zone generated by the energy source is about 80 microns wide it could take about 60 individual scans 1210 in order for all the powder within a 5 mm square grid region 1212-1 through 1212-3 to fall within the melt zone.

Figure 12F:
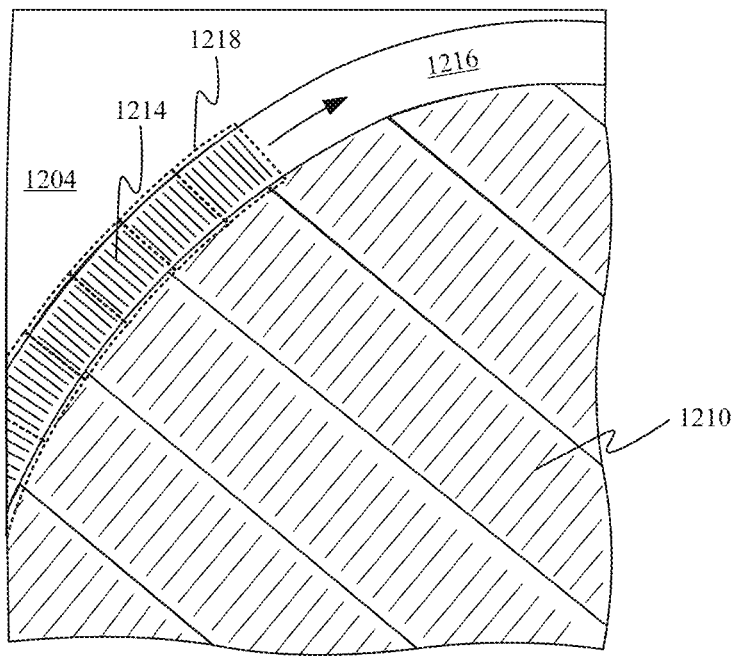

FIG. 12F shows an edge region of workpiece 1202 once the energy source finishes traversing the pattern of tracks 1206. In some embodiments, the energy source can continue to add energy to workpiece 1202 subsequent to a majority of the powder having been melted and resolidified. For example, contour scans 1214 can track along an outer periphery 1216 of workpiece 1202 in order to apply a surface finish to workpiece 1202. It should be appreciated that contour scans 1214 as depicted are substantially shorter than individual scans 1210. For this reason, grid regions 1218 can be substantially narrower than grid regions 1212-1 through 1212-3. It should also be noted that grid regions 1218 are not purely rectangular in shape as in this case they follow the contour of the outer periphery of workpiece 1202. Another instances that may result in scan length differences could be where a workpiece includes walls of varying thickness. A variable thickness wall could result in scans length varying within a single grid region. In such a case, an area of each grid region could be kept consistent by increasing the length of the grid region while narrowing the width to conform to changes in the length of individual scans.

Figure 13:
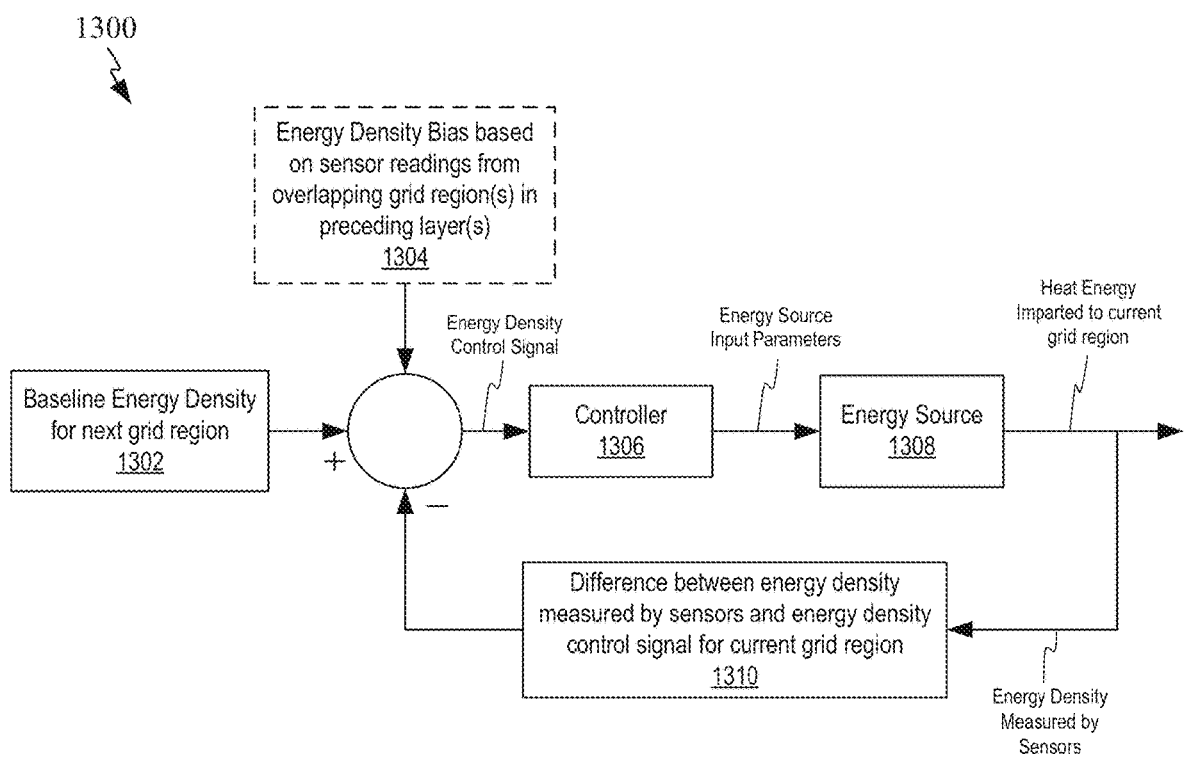
FIG. 13 shows a closed loop control example showing a feedback control loop for establishing and maintaining feedback control of an additive manufacturing operation.

FIG. 13 shows a closed loop control example showing feedback control loop 1300 for establishing and maintaining feedback control of an additive manufacturing operation. At block 1302 a baseline thermal energy density for the next grid region across which the energy source is about to traverse is input into the control loop. This baseline thermal energy density reading can be established from modeling and simulation programs and/or from previously run experimental/test runs. In some embodiments, this baseline thermal energy density data can be adjusted by energy density bias block 1304, which includes energy density readings for various grid regions recorded during preceding layers. Energy density bias block 1304 can include an adjustment to baseline energy density block in instances where preceding layers received too much or too little energy. For example, where optical sensor readings indicate a thermal energy density below nominal in one region of a workpiece, energy density bias values can increase the value of the baseline energy density for grid regions overlapping the grid regions with below nominal thermal energy density readings. In this way, the energy source is able to fuse additional powder that was not fully fused during the preceding layer or layers.

Other metrics besides energy density can be summed up or stored in the manner described in FIGS. 12A-12F. For example, max temperature could be one of these metrics and the method described herein for performing temperature correction based on a calculated correction factor can be used to obtain a more accurate max temperature for a given grid region. The binned max temperature data could be used in many ways. For example, the max temperature values could be averaged for each grid region or the highest max temperature could be associated with each grid region. Alternatively, the mode of the top 5 or 10 percent of the max temperature readings could be associated with the grid region to avoid the situation where a single instance of a highly elevated max temperature throws off what would otherwise be a more nominal max temperature value.

FIG. 13 also shows how the inputs from block 1302 and 1304 cooperatively create an energy density control signal that is received by controller 1306. Controller 1306 is configured to receive the energy density control signal and generate heat source input parameters configured to generate the desired thermal energy density within the current grid region. Input parameters can include power, scan velocity, hatch spacing, scan direction and scan duration. The input parameters are then received by energy source 1308 and any changes in the input parameters are adopted by energy source 1308 for the current grid region. Once optical sensors measure the scans of energy source 1308 making up the current grid region, at block 1310 thermal energy density for the current grid region is calculated and compared to the energy density control signal. If the two values are the same then no change to energy density control signal is made based upon the optical sensor data. However, if the two values are different the difference is added or subtracted from the energy density control signal for scans made in the next grid region.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An additive manufacturing method, comprising:
heating a powder distributed across a powder bed, using a heat source;
measuring temperature across a surface of the powder bed using a non-imaging optical sensor having a defined field of view;
estimating an area of a hot spot corresponding to a hottest region formed on the surface by the heat source;
estimating an area of a heated region corresponding to a locus of points within the field of view that contribute to the measured temperature, wherein the estimate tracks changes in the area of the heated region caused by temporal and spatial variations in operating parameters of the heat source; and
scaling the measured temperature by a correction factor calculated based on a ratio of the estimated area of the hot spot and the estimated area of the heated region.

2. The additive manufacturing method of claim 1, wherein the correction factor is $$\varphi_{CORRECTION} = \frac{A_{HEATED\ REGION}}{A_{HOT\ SPOT}},$$

where $A_{HEATED\ REGION}$ is the estimated area of the heated region and $A_{HOT\ SPOT}$ is the estimated area of the hot spot.

3. The additive manufacturing method of claim 1, further comprising:
applying operating parameters of the heat source and physical properties of the powder as inputs to a model that estimates a thermal field that describes, as a function of space and time, a temperature distribution produced in the powder by the heat source.

4. The additive manufacturing method of claim 3, further comprising:
estimating the area of the heated region by calculating radiated power for different points within the thermal field, and identifying points for which the radiated power is within a specified proportion of a peak radiated power of the thermal field.

5. An additive manufacturing method comprising:
depositing a layer of powder;
fusing one or more regions of the layer of powder using a heat source;
collecting temperature data describing temperature changes across a surface of the layer of powder during the fusing, wherein the temperature data is generated using a non-imaging optical sensor having a defined field of view;
estimating a size of a hot spot corresponding to a hottest region formed on the layer of powder by the heat source;
estimating a size of a heated region corresponding to a locus of points within the field of view that contribute to the temperature data; and
correcting the temperature data, wherein the correcting is performed by scaling the temperature data by a correction factor that is based on a ratio of the estimated size of the hot spot and the estimated size of the heated region.

6. The additive manufacturing method of claim 5, wherein the size of the hot spot is estimated to be equal to a size of an energy beam output by the heat source.

7. The additive manufacturing method of claim 5, further comprising:
estimating a thermal field that describes, as a function of space, a temperature distribution produced in the layer of powder by the heat source.

8. The additive manufacturing method of claim 7, wherein the heated region is estimated by calculating radiated power for different points within the thermal field, and identifying points for which the radiated power is within a specified proportion of a peak radiated power of the thermal field.

9. The additive manufacturing method of claim 7, wherein the thermal field is estimated as a function of space and time based on operating parameters of the heat source and physical properties of the layer of powder.

10. The additive manufacturing method of claim 9, wherein the operating parameters include at least one of a power output of the heat source, a travel speed of the heat source, a scan pattern of the heat source, a spatial orientation of the heat source relative to the layer of powder, or a size of an energy beam output by the heat source, and wherein the physical properties include at least one of a density of the layer of powder or a thermal conductivity of the layer of powder.

11. The additive manufacturing method of claim 5, wherein the temperature data is corrected by scaling an observed temperature by a correction factor $$\varphi_{CORRECTION} = \frac{A_{HEATED\ REGION}}{A_{HOT\ SPOT}},$$

where $A_{HEATED\ REGION}$ is an estimated area of the heated region and $A_{HOT\ SPOT}$ is an estimated area of the hot spot.

12. The additive manufacturing method of claim 5, wherein the optical sensor is a photodiode or a pyrometer.

13. An additive manufacturing system, comprising:
a heat source;
a layer of powder;
a non-imaging optical sensor configured to measure temperatures across a surface of the layer of powder during an additive manufacturing operation in which the layer of powder is heated by the heat source, wherein the optical sensor has a defined field of view; and
at least one processor configured to collect temperature data from the optical sensor, the at least one processor being further configured to:
estimate a size of a hot spot corresponding to a hottest region formed on the layer of powder by the heat source;
estimate a size of a heated region corresponding to a locus of points within the field of view that contribute to the temperature data; and
correct the temperature data by scaling the temperature data with a correction factor that is based on a ratio of the estimated size of the hot spot and the estimated size of the heated region.

14. The additive manufacturing system of claim 13, wherein the at least one processor estimates the size of the hot spot to be equal to a size of an energy beam output by the heat source.

15. The additive manufacturing system of claim 13, wherein the at least one processor is configured to estimate a thermal field that describes, as a function of space, a temperature distribution produced in the layer of powder by the heat source.

16. The additive manufacturing system of claim 15, wherein the at least one processor estimates the heated region by calculating radiated power for different points within the thermal field, and identifying points for which the radiated power is within a specified proportion of a peak radiated power of the thermal field.

17. The additive manufacturing system of claim 15, wherein the at least one processor is configured to estimate the thermal field as a function of space and time based on operating parameters of the heat source and physical properties of the layer of powder.

18. The additive manufacturing system of claim 17, wherein the operating parameters include at least one of a power output of the heat source, a travel speed of the heat source, a scan pattern of the heat source, a spatial orientation of the heat source relative to the layer of powder, or a size of an energy beam output by the heat source, and wherein the physical properties include at least one of a density of the layer of powder or a thermal conductivity of the layer of powder.

19. The additive manufacturing system of claim 13, wherein the at least one processor corrects the temperature data by scaling a measured temperature by a correction factor $$\varphi_{CORRECTION} = \frac{A_{HEATED\ REGION}}{A_{HOT\ SPOT}},$$

where $A_{HEATED\ REGION}$ is an estimated area of the heated region and $A_{HOT\ SPOT}$ is an estimated area of the hot spot.

20. The additive manufacturing system of claim 13, wherein the optical sensor is a photodiode or a pyrometer.

* * * * *